(12) United States Patent
Li et al.

(10) Patent No.: US 11,940,966 B2
(45) Date of Patent: Mar. 26, 2024

(54) METHOD, APPARATUS, AND SYSTEM FOR ESTIMATING DATABASE MANAGEMENT SYSTEM PERFORMANCE

(71) Applicant: HUAWEI TECHNOLOGIES CO., LTD., Guangdong (CN)

(72) Inventors: Guoliang Li, Beijing (CN); Tianqing Wang, Beijing (CN); Shifu Li, Beijing (CN); Lingtao Li, Shenzhen (CN); Kun Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/897,008

(22) Filed: Aug. 26, 2022

(65) Prior Publication Data
US 2022/0414075 A1 Dec. 29, 2022

Related U.S. Application Data

(63) Continuation of application No. PCT/CN2020/113204, filed on Sep. 3, 2020.

(30) Foreign Application Priority Data

Feb. 28, 2020 (CN) .......................... 202010134058.0

(51) Int. Cl.
*G06F 16/00* (2019.01)
*G06F 16/21* (2019.01)
(Continued)

(52) U.S. Cl.
CPC ........ *G06F 16/217* (2019.01); *G06F 16/2433* (2019.01); *G06F 16/24542* (2019.01)

(58) Field of Classification Search
CPC ............... G06F 16/217; G06F 16/2433; G06F 16/24542; G06F 16/21
See application file for complete search history.

(56) References Cited

U.S. PATENT DOCUMENTS

| 7,539,608 | B1 | 5/2009 | Dageville et al. |
| 8,015,454 | B1 | 9/2011 | Harrison et al. |

(Continued)

FOREIGN PATENT DOCUMENTS

| CN | 105138621 A | 12/2015 |
| CN | 107247811 A | 10/2017 |

(Continued)

OTHER PUBLICATIONS

Wentao Wu et al., Towards Predicting Query Execution Time for Concurrent and Dynamic Database Workloads, Proceedings of the VLDB Endowment, vol. 6, No. 10, Copyright 2013 VLDB Endowment 2150-8097/13/10, 12 pages.

(Continued)

*Primary Examiner* — Paul Kim
(74) *Attorney, Agent, or Firm* — WOMBLE BOND DICKINSON (US) LLP

(57) ABSTRACT

Disclosed is a method for estimating database management system performance, in which a performance change ratio of a DBMS can be determined once a first knob group, a second knob group, and a data volume of active data in data managed by the DBMS are obtained, without actually configuring the second knob group in the DBMS, executing a job by the DBMS, and then observing the execution. In other words, the performance change ratio of the DBMS can be estimated without interacting with the DBMS. DBMS security can be ensured, performance measurement approaches are provided for self-tuning and self-management of the DBMS, and reliable and stable running of the DBMS is ensured.

16 Claims, 11 Drawing Sheets

(51) Int. Cl.
  *G06F 16/242*   (2019.01)
  *G06F 16/2453*   (2019.01)

(56) References Cited

U.S. PATENT DOCUMENTS

| | | |
|---|---|---|
| 2006/0155697 A1* | 7/2006 | Rosengard ........ G06F 16/24539 |
| 2007/0130231 A1 | 6/2007 | Brown et al. |
| 2014/0136512 A1 | 5/2014 | Clifford et al. |
| 2018/0253463 A1 | 9/2018 | Bastawala et al. |
| 2019/0370235 A1 | 12/2019 | Yang et al. |
| 2021/0117719 A1* | 4/2021 | Tiwary ..................... G06N 7/01 |
| 2021/0224675 A1* | 7/2021 | P. ........................... G06N 3/006 |

FOREIGN PATENT DOCUMENTS

| | | |
|---|---|---|
| CN | 109213664 A | 1/2019 |
| CN | 109240901 A | 1/2019 |
| CN | 110019229 A | 7/2019 |

OTHER PUBLICATIONS

Dana Van Aken et al., Automatic Database Management System Tuning Through Large-scale Machine Learning, SIGMOD 17, May 14-19, 2017, Chicago, IL, USA, 16 pages.

\* cited by examiner

METHOD, APPARATUS, AND SYSTEM FOR ESTIMATING DATABASE MANAGEMENT SYSTEM PERFORMANCE

CROSS-REFERENCE TO RELATED APPLICATIONS

This application is a continuation of International Application No. PCT/CN2020/113204, filed on Sep. 3, 2020, which claims priority to Chinese Patent Application No. 202010134058.0, filed on Feb. 28, 2020. The disclosures of the aforementioned applications are hereby incorporated by reference in their entireties.

TECHNICAL FIELD

This application relates to the field of database management technologies, and in particular, to a method, an apparatus, and a system for estimating database management system performance.

BACKGROUND

Database management system (DBMS) performance is a very important indicator in database management. Its advantages and disadvantages directly affect the development of actual services and user experience. There are many factors that affect DBMS performance. For example, DBMS load fluctuation, different types of process jobs, such as DBMS transaction process (TP) and analysis process (AP), changes to DBMS configuration knobs, changes to configuration knobs of a system in which a DBMS is located, and changes to DBMS storage space all cause changes to the DBMS performance. Because there are many factors that affect the DBMS performance, it is very difficult to estimate DBMS performance changes.

Currently, DBMS execution performance can be obtained by interacting with the DBMS, thereby estimating the DBMS performance. For example, when the DBMS executes a job, execution effects are observed, an explain (explain) instruction is used, and an estimated cost value is provided by using a DBMS optimizer, to obtain the DBMS performance.

This method for obtaining DBMS performance by interacting with a DBMS causes interference to the DBMS, and further affects performance of a service supported by the DBMS.

SUMMARY

Embodiments of this application provide a method for estimating database management system performance, so that database management system (DBMS) performance can be estimated without interacting with a DBMS. In this way, performance measurement approaches are provided for self-tuning and self-management of the DBMS, and reliable and stable running of the DBMS is ensured.

To achieve the foregoing objective, the following technical solutions are used in embodiments of this application.

According to a first aspect, a method for estimating database management system performance is provided, including: obtaining a first knob group configured for a database management system DBMS, and obtaining a data volume of active data in data managed by the DBMS, where the first knob group includes at least one knob; obtaining a second knob group, where the second knob group includes at least one knob; and determining a performance change ratio of the DBMS based on the first knob group, the second knob group, and the data volume of the active data, where the performance change ratio indicates a change degree of DBMS performance achieved after the DBMS is configured by using the second knob group compared with DBMS performance achieved when the DBMS is configured by using the first knob group.

In the technical solution provided in the first aspect, the first knob group usually includes a plurality of knobs. For example, the knobs in the first knob group may include a size of a storage engine buffer pool (innodb_buffer_pool_size), a size of a chunk in a storage engine buffer pool (innodb_buffer_pool_chunk_size), a quantity of storage engine buffer pool instances (innodb_buffer_pool_instances), a size of a temporary table (tmp_table_size), and a key buffer size (key_buffer_size). The active data indicates data used when the DBMS executes a historical structured query language (SQL) statement. A knob included in the second knob group may be corresponding to a knob in the first knob group. A value of each knob in the second knob group may be the same as or different from a value of a knob in the first knob group. Usually, the first knob group and the second knob group each have at least one knob that has a different value. A difference between the first knob group and the second knob group lies in that each knob in the first knob group has been configured in the DBMS. In other words, the knobs in the first knob group are used for running the DBMS. The second knob group is not configured in the DBMS. The second knob group may be obtained after tuning is performed by using a tuning model of DBMS knobs, or may be determined by a user. The performance change ratio indicates performance achieved if the second knob group is used for configuring the DBMS/performance achieved if the first knob group is used for configuring the DBMS. The performance change ratio may indicate whether performance of the DBMS is improved or deteriorates if the second knob group is used for configuring the DBMS. If the performance change ratio equals 1, it indicates that there is no change. If the performance change ratio is greater than 1, it indicates that the performance is improved. If the performance change ratio is less than 1, it indicates that the performance deteriorates. Certainly, "improved" or "deteriorates" is a general term. A value of the performance change ratio may indicate a specific change degree. For example, the performance is improved by 0.5 times or deteriorates by 0.1 times. It can be learned from the first aspect that the performance change ratio of the DBMS can be determined once the first knob group, the second knob group, and the data volume of the active data in the data managed by the DBMS are obtained, without actually configuring the second knob group in the DBMS, executing a job by the DBMS, and then observing the execution. In other words, the performance change ratio of the DBMS can be estimated without interacting with the DBMS. DBMS security can be ensured, performance measurement approaches are provided for self-tuning and self-management of the DBMS, and reliable and stable running of the DBMS is ensured.

In a possible embodiment of the first aspect, the method further includes: obtaining a SQL statement; and estimating first estimated execution duration for the DBMS to execute the SQL statement.

In this possible embodiment, the estimated execution duration for the DBMS to execute the SQL statement can be estimated without inputting the SQL statement into the DBMS and enabling the DBMS to execute the SQL statement. Therefore, one more reference indicator is added for DBMS tuning, which can ensure that self-tuning and self-management of the DBMS are implemented in a better way, and further ensures reliable and stable running of the DBMS.

In a possible embodiment of the first aspect, the method further includes: estimating a performance indicator of the DBMS based on the performance change ratio of the DBMS, the first estimated execution duration, and the data volume of the active data, where the performance indicator includes at least one of second estimated execution duration of the SQL statement and a throughput of the DBMS, and the second estimated execution duration is a modification value of the first estimated execution duration.

In this possible embodiment, the estimated execution duration of the SQL statement may be further optimized, and a throughput of the DBMS achieved when the second knob group is used for configuring the DBMS may be further estimated. In this way, whether configuration of the second knob group is suitable for the DBMS can be better determined. If the performance indicator indicates that the configuration is not suitable, the second knob group is not to be configured in the DBMS. Compared with a case in which the second knob group is configured in the DBMS and then it is determined, based on a DBMS execution result, that the configuration of the second knob group is not suitable for the DBMS, this embodiment helps ensure stable running of the DBMS, and improves accuracy of knob configuration of the DBMS.

In a possible embodiment of the first aspect, the operation of estimating a performance indicator of the DBMS based on the performance change ratio of the DBMS, the first estimated execution duration, and the data volume of the active data includes: inputting the performance change ratio of the DBMS, the first estimated execution duration, and the data volume of the active data into a performance estimator, where a training sample of the performance estimator includes a historical performance change ratio of the DBMS, execution duration of a historical SQL statement, and a data volume of active data managed by the DBMS and a historical performance indicator that are obtained when the DBMS executes the historical SQL statement.

It should be noted that "historical performance change ratio" and "execution duration of a historical SQL statement" in this application refer to data collected in a previous DBMS execution process.

In this possible embodiment, the performance indicator of the DBMS, for example, execution duration or a throughput, is estimated by using data in three dimensions: the performance change ratio of the DBMS, the first estimated execution duration, and the data volume of the active data. Then, the DBMS is adjusted based on a case reflected by the performance indicator. In this way, a more suitable knob can be determined for the DBMS, thereby improving accuracy of DBMS tuning.

In a possible embodiment of the first aspect, the operation of determining a performance change ratio of the DBMS based on the first knob group, the second knob group, and the data volume of the active data includes: modifying, based on the data volume of the active data in the DBMS, knobs that are in the first knob group and the second knob group and that are related to the data volume of the active data; performing dimension reduction on the modified first knob group and second knob group to obtain a first vector and a second vector, where the first knob group is a vector whose dimension is higher than that of the first vector, and the second knob group is a vector whose dimension is higher than that of the second vector; and determining the performance change ratio of the DBMS based on the first vector and the second vector.

In this possible embodiment, the first knob group and the second knob group are modified by using the data volume of the active data, so that the data volume of the active data can be fitted with DBMS knobs. Therefore, it can be ensured that a knob determined for DBMS tuning matches a current case of the DBMS to the maximum extent, and excessive resource waste does not occur, thereby ensuring resource utilization of a database system.

In a possible embodiment of the first aspect, the operation of modifying, based on the data volume of the active data in the DBMS, knobs that are in the first knob group and the second knob group and that are related to the data volume of the active data includes: adjusting target knobs that are in the first knob group and the second knob group and that are related to the data volume of the active data to be equal to the data volume of the active data, where the target knobs are knobs that are in the first knob group and the second knob group and that are greater than the data volume of the active data.

In this possible embodiment, in the data modification process, if a value of a specific knob in the first knob group or the second knob group is greater than the data volume of the active data, the value of the knob is reduced to be equal to the data volume. The knob innodb_buffer_pool_size is used as an example. If a value of this knob in the first knob group is greater than the data volume of the active data, the value of this knob in the first knob group is modified to be equal to the data volume. If a value of this knob in the second knob group is also greater than the data volume, the value of this knob in the second knob group is also modified to be equal to the data volume. Alternatively, if values of this knob in the first knob group and second knob group are both less than the data volume, the values are not modified. Regardless of whether a knob is in the first knob group or the second knob group, a value of the knob is modified only when the value is greater than the data volume. In this possible embodiment, modification of a knob in the first knob group or the second knob group can be accelerated by using a data volume modification module.

In a possible embodiment of the first aspect, the operation of determining the performance change ratio of the DBMS based on the first vector and the second vector includes: inputting the first vector and the second vector into a double knobs mixture model, where a training sample of the double knobs mixture model includes a plurality of pairs of first historical knob groups and second historical knob groups that have been configured for the DBMS, and a performance change ratio that is of the DBMS and that is corresponding to each pair of first historical knob group and second historical knob group; and determining the performance change ratio of the DBMS by using the double knobs mixture model. The first historical knob group is a group of knobs that have been used by the DBMS. The second historical knob group is another group of knobs that have been used by the DBMS. The first historical knob group and the second historical knob group form a pair. A performance change ratio of DBMS performance achieved when the second historical knob group is used to DBMS performance achieved when the first historical knob group is used is the performance change ratio that is of the DBMS and that is corresponding to the pair of first historical knob group and second historical knob group.

In this possible embodiment, the performance change ratio of the DBMS can be quickly determined by using the double knobs mixture model (double knobs mixture model, DKMM).

In a possible embodiment of the first aspect, the operation of estimating first estimated execution duration for the DBMS to execute the SQL statement includes: converting the SQL statement into a third vector; determining a complexity coefficient of the SQL statement based on the third vector; and estimating, based on the complexity coefficient, the first estimated execution duration for the DBMS to execute the SQL statement.

In this possible embodiment, a complexity coefficient of a SQL statement is determined by using a vector, and then execution duration is estimated by using the complexity coefficient, thereby ensuring accuracy of execution duration estimation.

In a possible embodiment of the first aspect, the SQL statement includes a subquery statement, and the operation of converting the SQL statement into a third vector includes: determining complexity of the subquery statement by using a relational expression of complexity and a condition factor, where the condition factor includes a condition type in subquery and a table type related to the subquery; determining a vector of the subquery statement based on the complexity of the subquery statement; inputting the vector of the subquery statement into a cost model to obtain a complexity coefficient of the subquery statement, where a training sample of the cost model includes a vector of a historical SQL statement executed by the DBMS and a complexity coefficient of the historical SQL statement; and determining the third vector of the SQL statement based on the complexity coefficient of the subquery statement and a nesting relationship between the subquery statement and an upper-layer query statement that includes the subquery statement.

The operation of converting the SQL statement into a third vector may be alternatively described as: converting the SQL statement into a statement template according to a preset template rule, where if the SQL statement includes a subquery statement, the statement template includes at least one subtemplate corresponding to the subquery statement; determining complexity of each subtemplate by using a relational expression of complexity and a condition factor, where the condition factor includes a condition type in the subtemplate and a related table type; determining a vector of the subquery statement based on the complexity of each subtemplate; inputting the vector of the subquery statement into a cost model to obtain a complexity coefficient of the subquery statement, where a training sample of the cost model includes a vector of a historical SQL statement executed by the DBMS and a complexity coefficient of the historical SQL statement; and recursively determining the third vector of the SQL statement based on the complexity coefficient of the subquery statement and a recursive relationship between the subquery statement and an upper-layer query statement.

In this possible embodiment, the preset template rule indicates which structures in a SQL statement can form a template. For example, a structure "select*from*where" can form a template. A SQL statement may include two or more layers of query relationships, and a statement at each layer may be considered as a subquery statement. A large template corresponding to a SQL statement may be referred to as a statement template, and a template corresponding to a subquery statement may be referred to as a subtemplate. For example, if a statement template includes "Select*from where {select*from*where; +min}+order by+limit", "select*from*where;" in "{select*from*where; +min}" may be referred to as a subtemplate, and "min" may also be referred to as a subtemplate. A subquery statement may include "equivalence conditions", "non-equivalence conditions", or the like. These "equivalence conditions" or "non-equivalence conditions" all belong to the condition type. A subtemplate may further relate to some tables, for example, an area query table or a nationality query table. These tables all belong to the table type. An initial vector of the subquery statement may be marked as 0 in each dimension. After the complexity of the subtemplate is determined, 0 in a dimension corresponding to the subtemplate may be modified in the initial vector by using a specific value of the complexity of the subtemplate, to determine the vector of the subquery statement. The complexity coefficient of the subquery statement can be obtained by using the cost model, and a vector of an upper-layer query statement can be obtained through processing in a recursive manner. By analogy, the vector of the SQL statement, that is, the third vector, can be obtained.

In a possible embodiment of the first aspect, the operation of determining a complexity coefficient of the SQL statement based on the third vector includes: inputting the third vector into the cost model; and determining the complexity coefficient of the SQL statement by using the cost model.

In this possible embodiment, the complexity coefficient is determined by using the pre-trained cost model, so that determining of the complexity coefficient can be accelerated.

In a possible embodiment of the first aspect, the operation of estimating, based on the complexity coefficient, the first estimated execution duration for the DBMS to execute the SQL statement includes: estimating, based on the complexity coefficient of the SQL statement and a relational expression of a complexity coefficient and execution duration, the first estimated execution duration for the DBMS to execute the SQL statement.

In a possible embodiment of the first aspect, the operation of estimating, based on the complexity coefficient, the first estimated execution duration for the DBMS to execute the SQL statement includes: inputting the complexity coefficient into an execution time modification model, where a training sample of the execution time modification model includes a complexity coefficient of a historical SQL statement executed by the DBMS and execution duration of the historical SQL statement; and determining, by using the execution time modification model, the first estimated execution duration for the DBMS to execute the SQL statement.

In this possible embodiment, the execution duration is estimated by using the pre-trained execution time modification model, so that estimation of the execution duration can be accelerated.

A second aspect of this application provides a method for estimating database management system performance, including: obtaining a first knob group and a second knob group, where the first knob group includes at least one knob, and the second knob group includes at least one knob; obtaining a data volume of active data in data managed by a DBMS; and determining a performance change ratio of the DBMS based on the first knob group, the second knob group, and the data volume of the active data, where the performance change ratio indicates a change degree of DBMS performance achieved after the DBMS is configured by using the second knob group compared with DBMS performance achieved when the DBMS is configured by using the first knob group.

With reference to the second aspect, any possible embodiment of the first aspect may be combined with the second aspect to become any possible embodiment of the second aspect.

A difference between the second aspect and the first aspect lies in that the first knob group obtained in the second aspect may not be the first knob group used by the DBMS, and the first knob group in the second aspect may be alternatively obtained by using a knob tuning model or configured by a user.

According to a third aspect, an apparatus for estimating database management system performance is provided, and is configured to perform the method in any one of the first aspect or the possible embodiments of the first aspect. Specifically, the apparatus includes modules or units configured to perform the method according to any one of the first aspect or the possible embodiments of the first aspect.

According to a fourth aspect, an apparatus for estimating database management system performance is provided, and is configured to perform the method in any one of the second aspect or the possible embodiments of the second aspect. Specifically, the apparatus includes modules or units configured to perform the method according to any one of the second aspect or the possible embodiments of the second aspect.

According to a fifth aspect, an apparatus for estimating database management system performance is provided. The apparatus may include at least one processor, a memory, and a communications interface. The processor is coupled to the memory and the communications interface. The memory is configured to store instructions, the processor is configured to execute the instructions, and the communications interface is configured to communicate with another network element under control of the processor. When the instructions are executed by the processor, the processor is enabled to perform the method in any one of the first aspect or the possible embodiments of the first aspect.

According to a sixth aspect, an apparatus for estimating database management system performance is provided. The apparatus may include at least one processor, a memory, and a communications interface. The processor is coupled to the memory and the communications interface. The memory is configured to store instructions, the processor is configured to execute the instructions, and the communications interface is configured to communicate with another network element under control of the processor. When the instructions are executed by the processor, the processor is enabled to perform the method in any one of the second aspect or the possible embodiments of the second aspect.

According to a seventh aspect, a database system is provided. The database system includes the apparatus for estimating database management system performance in the third aspect or the fifth aspect, a database management system, and a database.

According to an eighth aspect, a database system is provided. The database system includes the apparatus for estimating database management system performance in the fourth aspect or the sixth aspect, a database management system, and a database.

According to a ninth aspect, a computer readable storage medium is provided, where the computer readable storage medium stores a program, and the program enables a data query apparatus to perform the method for estimating database management system performance in any one of the first aspect and the embodiments of the first aspect.

According to a tenth aspect, a computer readable storage medium is provided, where the computer readable storage medium stores a program, and the program enables a data query apparatus to perform the method for estimating database management system performance in any one of the second aspect and the embodiments of the second aspect.

According to an eleventh aspect, a computer program product is provided, where the computer program product includes computer executable instructions, and the computer executable instructions are stored in a computer readable storage medium. At least one processor of a device may read the computer executable instructions from the computer readable storage medium, and the at least one processor executes the computer executable instructions, so that the device performs the method for estimating database management system performance provided in any one of the first aspect or the possible embodiments of the first aspect.

According to a twelfth aspect, a computer program product is provided, where the computer program product includes computer executable instructions, and the computer executable instructions are stored in a computer readable storage medium. At least one processor of a device may read the computer executable instructions from the computer readable storage medium, and the at least one processor executes the computer executable instructions, so that the device performs the method for estimating database management system performance provided in any one of the second aspect or the possible embodiments of the second aspect.

It may be understood that any one of the apparatuses for estimating database management system performance, computer storage media, or computer program products provided above is used to perform the corresponding method for estimating database management system performance provided above. Therefore, for beneficial effects that can be achieved by the apparatus for estimating database management system performance, the computer storage medium, or the computer program product, refer to beneficial effects of the corresponding method provided above. Details are not described herein again.

DESCRIPTION OF EMBODIMENTS

The following describes embodiments of this application with reference to accompanying drawings. It is clear that the described embodiments are merely some rather than all of the embodiments of this application. A person of ordinary skill in the art may learn that the technical solutions provided in the embodiments of this application are also applicable to a similar technical problem as a technology evolves and a new scenario emerges.

In the specification, claims, and the accompanying drawings of this application, the terms "first", "second", and the like are intended to distinguish similar objects but do not necessarily indicate a specific order or sequence. It should be understood that data termed in such a way is interchangeable in proper circumstances, so that the embodiments described herein can be implemented in other orders than the order illustrated or described herein. In addition, the terms "include", "contain" and any other variants mean to cover the non-exclusive inclusion. For example, processes, methods, systems, products, or devices that include a series of operations or units are not limited to the operations or the units that are clearly listed, and may include other operations and units that are not clearly listed or that are essential for the processes, methods, products, or devices.

Embodiments of this application provide a method for estimating database management system performance, so that database management system (DBMS) performance can be estimated without interacting with a DBMS. In this way, performance measurement approaches are provided for self-tuning and self-management of the DBMS, and reliable and stable running of the DBMS is ensured. Details are separately described below.

The method provided in the embodiments of this application may be implemented as a part of a database management system, or as an independent component. The method provided in the embodiments of this application may be applied to a single-server database system or a cluster database system. A database system usually includes the following three parts: (1) A database (DB), which is a collection of organized and shareable data stored in a computer over a long period of time. The data in the database is organized, described, and stored according to a mathematical model, has relatively small redundancy, has relatively high data independence and easy scalability, and can be shared among various users. (2) Hardware, including a data store required for data storage, for example, a memory and/or a disk. (3) Software, including a DBMS. The DBMS is core software of the database system, and is system software used to organize and store data scientifically and obtain and maintain data efficiently. A database engine is a core component of the DBMS.

Figure 1A:
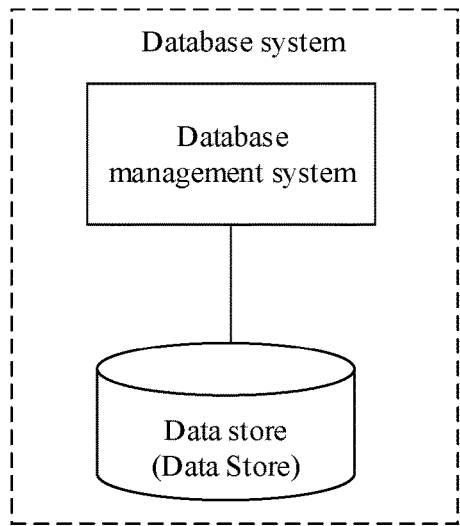
FIG. 1A is a schematic diagram of a single-server database system.

Specifically, FIG. 1A is a schematic diagram of a single-server database system. The single-server database system includes a database management system and a data store. The database management system is configured to provide a service such as query and modification of a database, and the database management system stores data in the data store. In the single-server database system, the database management system and the data store are usually located on a single server, such as a symmetric multi-processor (SMP) server. The SMP server includes a plurality of processors. All the processors share resources such as a bus, a memory, and an I/O system. A function of the database management system may be implemented by executing a program in the memory by one or more processors.

Figure 1B:
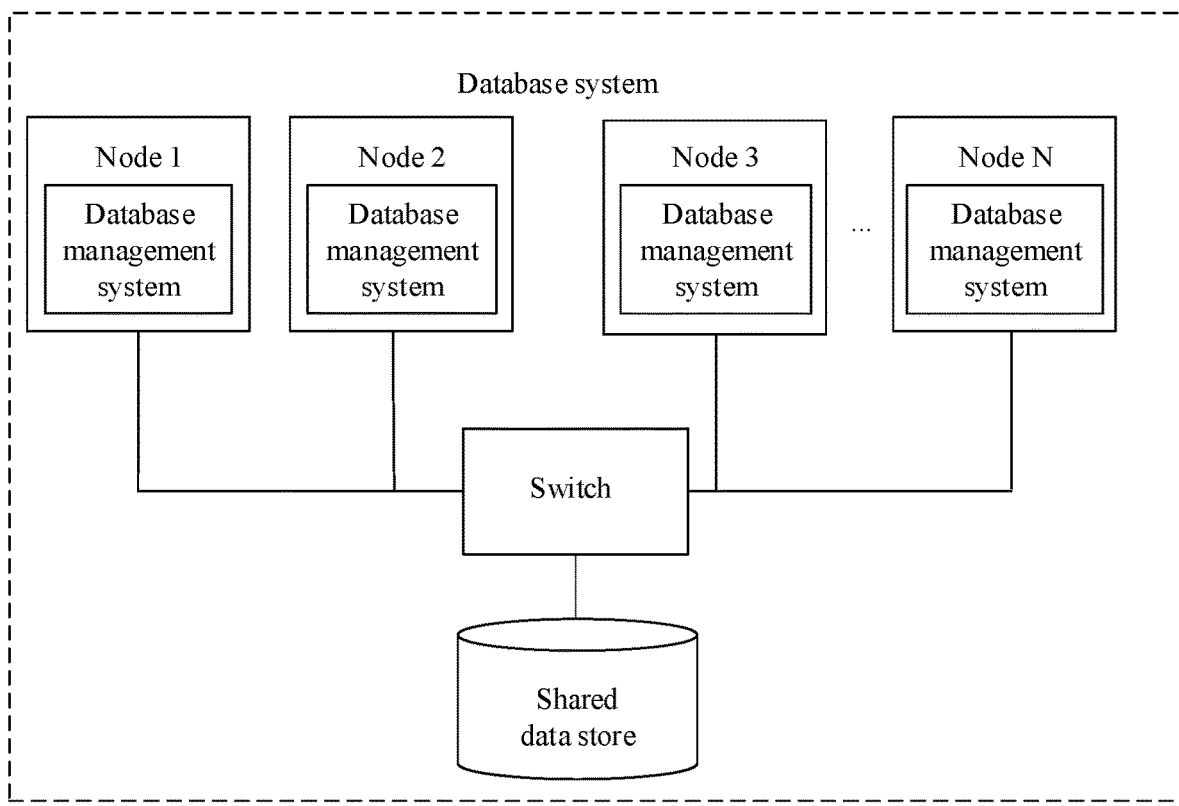
FIG. 1B is a schematic diagram of a cluster database system of a shared-storage architecture.

FIG. 1B is a schematic diagram of a cluster database system of a shared-storage architecture. The cluster database system includes a plurality of nodes (such as nodes 1 to N in FIG. 1B). A database management system is deployed on each node, and separately provides services such as database query and modification for a user. The plurality of database management systems store shared data in a shared data store, and perform a read/write operation on the data in the data store through a switch. The shared data store may be a shared disk array. The node in the cluster database system may be a physical machine, for example, a database server, or may be a virtual machine (VM) or a container running on an abstract hardware resource. When the node is a virtual machine or a container, the database management system deployed on the node is a DBMS instance, and the DBMS may be a process or a thread. If the node is a physical machine, the switch is a storage area network (SAN) switch, an ethernet switch, a fiber channel switch, or another physical switching device. If the node is a virtual machine or a container, the switch is a virtual switch.

Figure 1C:
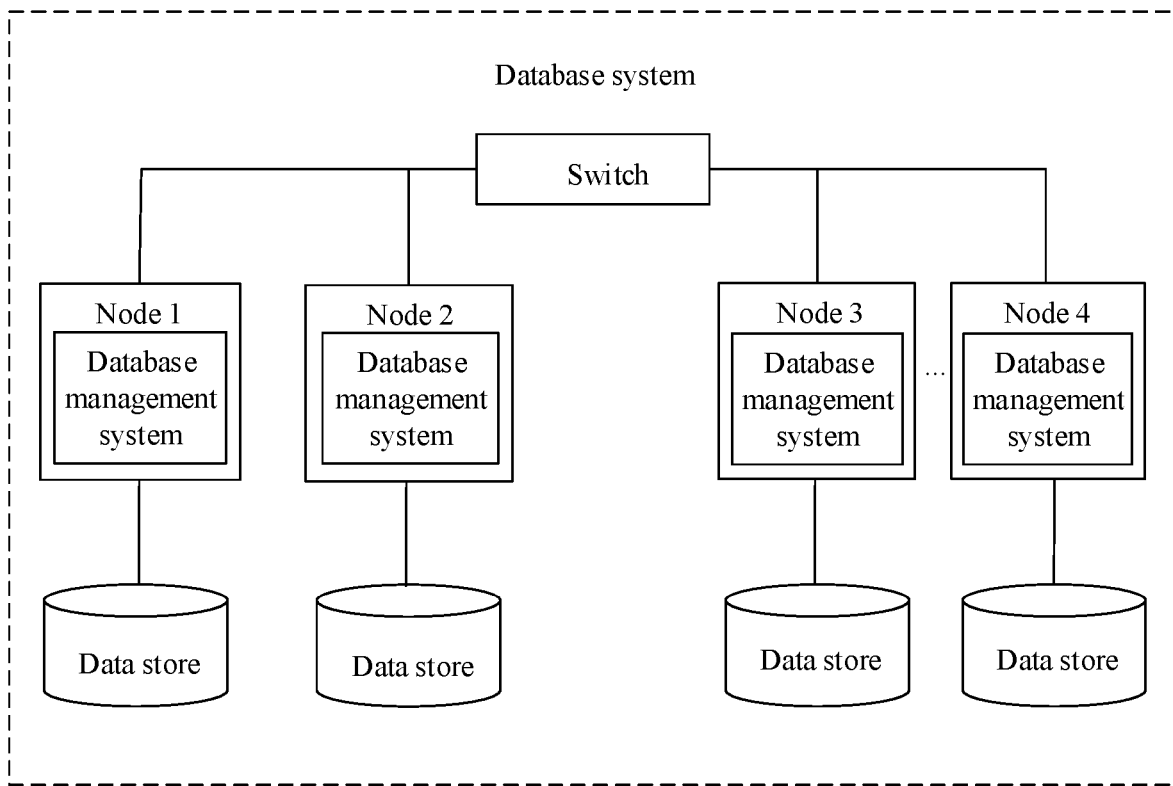
FIG. 1C is a schematic diagram of a cluster database system of a shared-nothing architecture.

FIG. 1C is a schematic diagram of a cluster database system of a shared-nothing architecture. Each node has an exclusive hardware resource (such as a data store), an operating system, and a database, and nodes communicate with each other by using a network. In the system, data is distributed to the nodes according to a database model and an application characteristic. A query task is divided into several portions, to be executed concurrently on all the nodes. All the nodes perform calculation coordinately and serve as a whole to provide a database service. All communications functions are implemented in a high-bandwidth network interconnection system. Similar to the cluster database system of the shared-storage architecture described in FIG. 1B, the node herein may be a physical machine or a virtual machine.

In all the embodiments of this application, a data store of a database system includes but is not limited to a solid state drive (SSD), a disk array, or another type of non-transitory computer readable medium. Although a database is not shown in FIG. 1A to 1C, it should be understood that the database is stored in the data store. A person skilled in the art may understand that the database system may include components more or less than those shown in FIG. 1A to FIG. 1C, or include components different from those shown in FIG. 1A to FIG. 1C. FIG. 1A to FIG. 1C merely show components more related to embodiments disclosed in the embodiments of the present disclosure. For example, although four nodes are described in FIG. 1B and FIG. 1C, a person skilled in the art may understand that the cluster database system may include any quantity of nodes. Functions of database management system of the nodes may be implemented by using an appropriate combination of software, hardware and/or firmware on the nodes.

For ease of understanding and description, a node in a cluster database system of a shared-nothing architecture, that is, a database server, is used as an example but not as a limitation for describing the solutions of the embodiments of this application in the following. However, a person skilled in the art may clearly understand, according to teachings of the embodiments of this application, that the method in the embodiments of this application may also be applied to a cluster database system of a shared-storage architecture, a single-server database system, and any type of relational database system.

Based on the database systems in FIG. 1A to FIG. 1C, the method for estimating database management system performance provided in the embodiments of this application may include the following several solutions.

First: determining a performance change ratio of a DBMS;

Second: estimating first estimated execution duration for the DBMS to execute a SQL statement; and Third: determining a performance indicator of the DBMS by using the "performance change ratio of a DBMS" in the first solution, the "first estimated execution duration" in the second solution, and a data volume of active data in data managed by the DBMS.

The following describes the three solutions separately with reference to the accompanying drawings.

Figure 2:
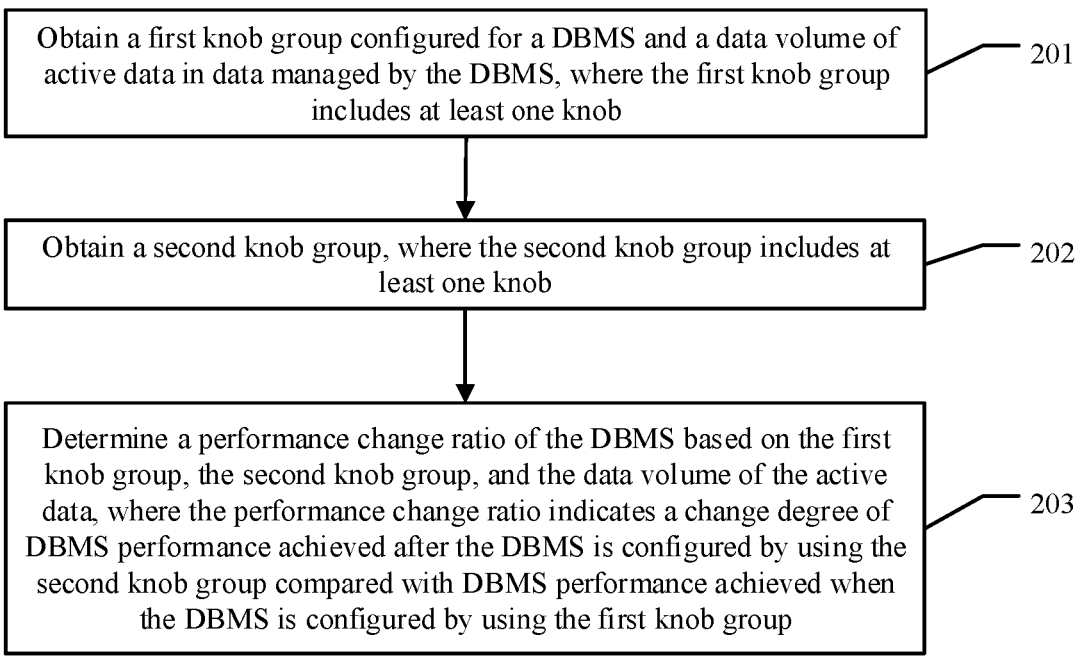
FIG. 2 is a schematic diagram of an embodiment of a method for estimating database management system performance according to an embodiment of this application.

For the first solution, as shown in FIG. 2, an embodiment of a method for estimating database management system performance according to an embodiment of this application includes the following operations.

201: Obtain a first knob group configured for a DBMS and a data volume of active data in data managed by the DBMS, where the first knob group includes at least one knob.

The first knob group usually includes a plurality of knobs. For example, the knobs in the first knob group may include a size of a storage engine buffer pool (innodb_buffer_pool_size), a size of a chunk in a storage engine buffer pool (innodb_buffer_pool_chunk_size), a quantity of storage engine buffer pool instances (innodb_buffer_pool_instances), a size of a temporary table (tmp_table_size), and a key buffer size (key_buffer_size).

The active data indicates data used when the DBMS executes a historical SQL statement.

202: Obtain a second knob group, where the second knob group includes at least one knob.

A knob included in the second knob group may be corresponding to a knob in the first knob group. A value of each knob in the second knob group may be the same as or different from a value of a knob in the first knob group. Usually, the first knob group and the second knob group each have at least one knob that has a different value.

A difference between the first knob group and the second knob group lies in that each knob in the first knob group has been configured in the DBMS. In other words, the knobs in the first knob group are used for running the DBMS. The second knob group is not configured in the DBMS. The second knob group may be obtained after tuning is performed by using a tuning model of DBMS knobs, or may be determined by a user.

203: Determine a performance change ratio of the DBMS based on the first knob group, the second knob group, and the data volume of the active data, where the performance change ratio indicates a change degree of DBMS performance achieved after the DBMS is configured by using the second knob group compared with DBMS performance achieved when the DBMS is configured by using the first knob group.

In an embodiment, the performance change ratio indicates performance achieved if the second knob group is used for configuring the DBMS/performance achieved if the first knob group is used for configuring the DBMS. The performance change ratio may indicate whether performance of the DBMS is improved or deteriorates if the second knob group is used for configuring the DBMS. If the performance change ratio equals 1, it indicates that there is no change. If the performance change ratio is greater than 1, it indicates that the performance is improved. If the performance change ratio is less than 1, it indicates that the performance deteriorates. Certainly, "improved" or "deteriorates" is a general term. A value of the performance change ratio may indicate a specific change degree. For example, the performance is improved by 0.5 times or deteriorates by 0.1 times.

It can be learned from the first solution that the performance change ratio of the DBMS can be determined once the first knob group, the second knob group, and the data volume of the active data in the data managed by the DBMS are obtained, without actually configuring the second knob group in the DBMS, executing a job by the DBMS, and then observing the execution. In other words, the performance change ratio of the DBMS can be estimated without interacting with the DBMS. DBMS security can be ensured, performance measurement approaches are provided for self-tuning and self-management of the DBMS, and reliable and stable running of the DBMS is ensured.

The second solution provided in the embodiments of this application may be implemented on a basis of the first solution, or may be implemented independently of the first solution.

An embodiment of the method for estimating database management system performance provided in the second solution includes: obtaining a structured query language SQL statement; and estimating first estimated execution duration for the DBMS to execute the SQL statement.

The third solution provided in the embodiments of this application is implemented on a basis of the first solution and the second solution. An embodiment of the method for estimating database management system performance provided in the third solution includes: estimating a performance indicator of the DBMS based on the performance change ratio of the DBMS, the first estimated execution duration, and the data volume of the active data, where the performance indicator includes at least one of second estimated execution duration of the SQL statement and a throughput of the DBMS, and the second estimated execution duration is a modification value of the first estimated execution duration.

For better understanding of the foregoing three solutions, embodiment processes of the three solutions are described in detail in the following with reference to a schematic diagram of a scenario in FIG. 3.

Figure 3:
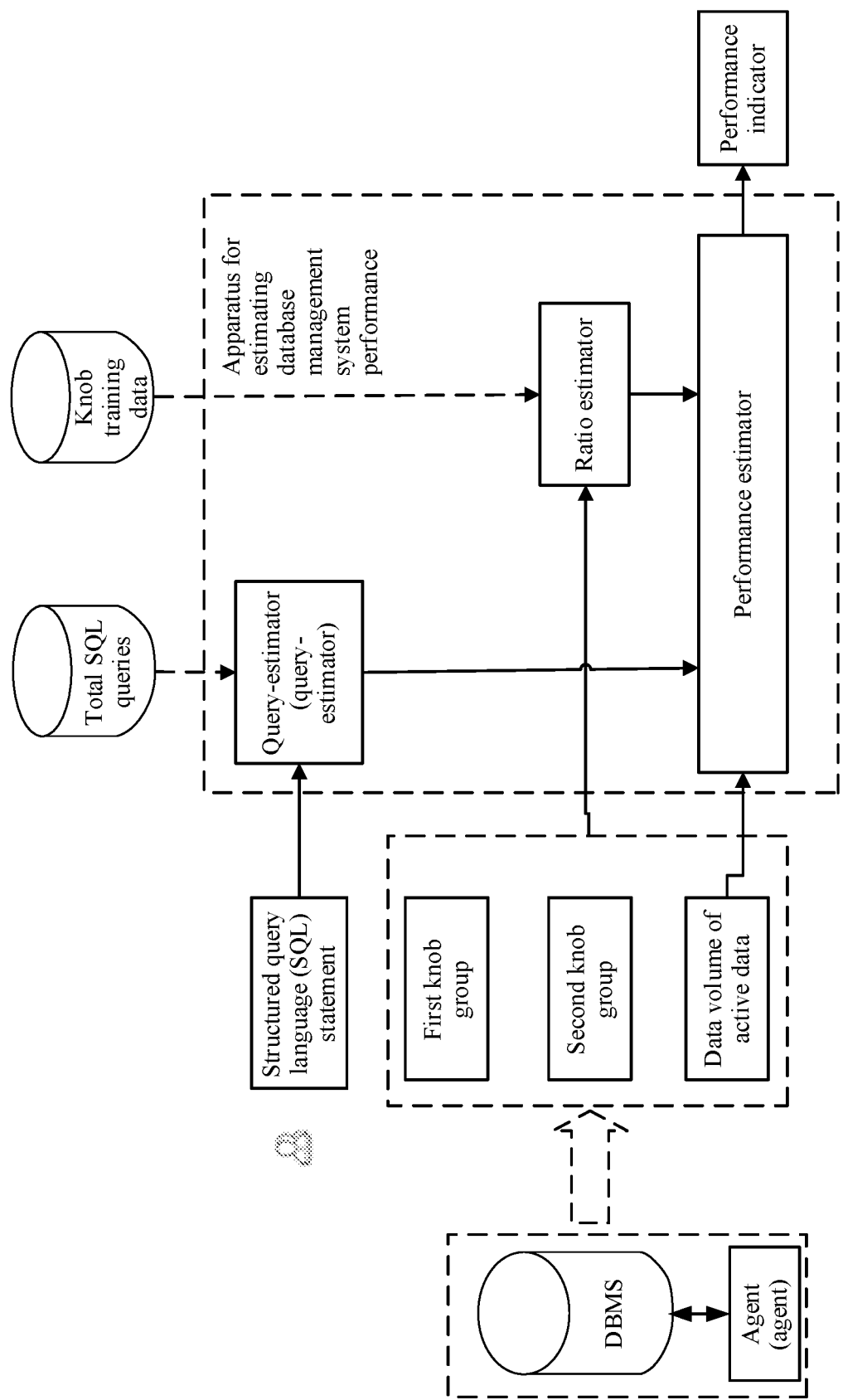
FIG. 3 is a schematic diagram of a scenario of a method for estimating database management system performance according to an embodiment of this application.

In the scenario shown in FIG. 3, an apparatus for estimating database management system performance includes a ratio estimator, a query-estimator, and a performance estimator.

The ratio estimator is obtained by training a training sample. The training sample includes a plurality of pairs of first historical knob groups and second historical knob groups, a performance change ratio that is of the DBMS and that is corresponding to each pair of first historical knob group and second historical knob group, and a data volume of active data used when the DBMS is configured by using the first historical knob group and the second historical knob group.

The query-estimator is obtained by training total SQL queries. The total SQL queries include execution duration for the DBMS to process SQL statements corresponding to the total SQL queries, or complexity coefficients of SQL statements.

A training sample of the performance estimator includes a historical performance change ratio of the DBMS, execution duration of a historical SQL statement, and a data volume of active data managed by the DBMS and a historical performance indicator that are obtained when the DBMS executes the historical SQL statement.

The foregoing total SQL queries and training samples may be collected through interaction between an agent and the DBMS.

After being trained, the ratio estimator, the query-estimator (query-estimator), and the performance estimator can be applied to the apparatus for estimating database management system performance, to perform corresponding estimation functions.

In an estimation process, the ratio estimator receives a first knob group, a second knob group, and a data volume of active data, and then performs estimation to obtain a performance change ratio of the DBMS, where the performance change ratio indicates a change degree of DBMS performance achieved after the DBMS is configured by using the second knob group compared with DBMS performance achieved when the DBMS is configured by using the first knob group.

After receiving a SQL statement input by a user, the query-estimator may obtain first estimated execution duration for the DBMS to execute the SQL statement.

After obtaining the performance change ratio of the DBMS output by the ratio estimator, the first estimated execution duration of the SQL statement, and the data volume of the active data, the performance estimator may estimate a performance indicator of the DBMS, where the performance indicator includes at least one of second estimated execution duration of the SQL statement and a throughput of the DBMS, and the second estimated execution duration is a modification value of the first estimated execution duration.

In embodiments, operation 203 may include: modifying, based on the data volume of the active data in the DBMS, knobs that are in the first knob group and the second knob group and that are related to the data volume of the active data; performing dimension reduction on the modified first knob group and second knob group to obtain a first vector and a second vector, where the first knob group is a vector whose dimension is higher than that of the first vector, and the second knob group is a vector whose dimension is higher than that of the second vector; and determining the performance change ratio of the DBMS based on the first vector and the second vector.

It may be alternatively understood that the ratio estimator includes a data volume modification module and a double knobs mixture model (DKMM).

The data volume modification module may adjust target knobs that are in the first knob group and the second knob group and that are related to the data volume of the active data to be equal to the data volume of the active data, where the target knobs are knobs that are in the first knob group and the second knob group and that are greater than the data volume of the active data.

The double knobs mixture model is obtained through training based on a plurality of pairs of first historical knob groups and second historical knob groups that have been configured for the DBMS, and a performance change ratio that is of the DBMS and that is corresponding to each pair of first historical knob group and second historical knob group. The first historical knob group is a group of knobs that have been used by the DBMS. The second historical knob group is another group of knobs that have been used by the DBMS. The first historical knob group and the second historical knob group form a pair. A performance change ratio of DBMS performance achieved when the second historical knob group is used to DBMS performance achieved when the first historical knob group is used is the performance change ratio that is of the DBMS and that is corresponding to the pair of first historical knob group and second historical knob group. For example, a training sample including the following is used: a first historical knob group that has been configured for the DBMS, a second historical knob group that has been configured for the DBMS, and a performance change ratio of DBMS performance achieved when the second historical knob group is used to DBMS performance achieved when the first historical knob group is used. When there are a plurality of similar training samples, the double knobs mixture model can be obtained through machine learning. Model training based on training samples may be implemented with reference to the conventional technology. Details are not described in this embodiment of the present disclosure.

In this way, the process in which the ratio estimator performs estimation may be completed by using the data volume modification module and the double knobs mixture model. The process may be understood with reference to FIG. 4.

Figure 4:
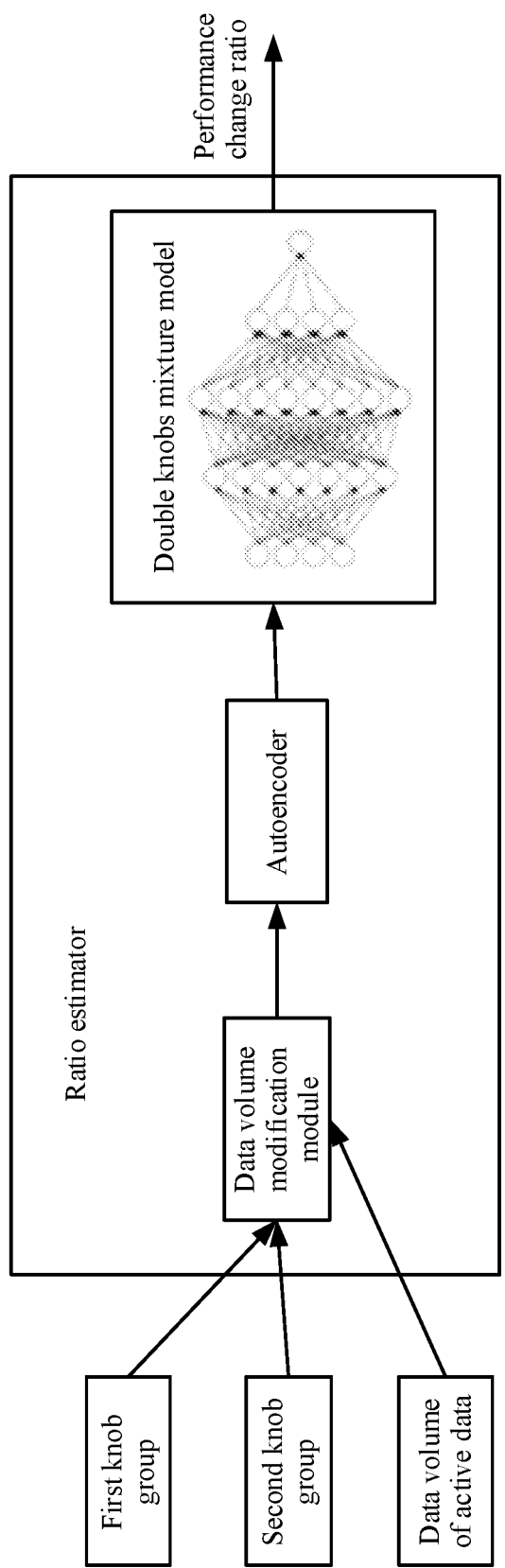
FIG. 4 is a schematic diagram of another embodiment of a method for estimating database management system performance according to an embodiment of this application.

As shown in FIG. 4, the data volume modification module receives a first knob group, a second knob group, and a data volume of active data in the DBMS, and then modifies knobs that are in the first knob group and the second knob group and that are related to the data volume of the active data.

In the data modification process, if a value of a specific knob in the first knob group or the second knob group is greater than the data volume of the active data, the value of the knob is reduced to be equal to the data volume. The knob innodb_buffer_pool_size is used as an example. If a value of this knob in the first knob group is greater than the data volume of the active data, the value of this knob in the first knob group is modified to be equal to the data volume. If a value of this knob in the second knob group is also greater than the data volume, the value of this knob in the second knob group is also modified to be equal to the data volume. Alternatively, if values of this knob in the first knob group and second knob group are both less than the data volume, the values are not modified. Regardless of whether a knob is in the first knob group or the second knob group, a value of the knob is modified only when the value is greater than the data volume.

Knobs in the modified first knob group and second knob group are usually high-dimensional vectors. Therefore, the ratio estimator may further include an autoencoder, so that the autoencoder may perform dimension reduction on the modified first knob group and second knob group to obtain a first vector and a second vector. The first knob group is a vector whose dimension is higher than that of the first vector, and the second knob group is a vector whose dimension is higher than that of the second vector.

Then, the DKMM receives the first vector and the second vector, and determines the performance change ratio of the DBMS by using a neural network structure of the DKMM. The DKMM may concatenate the first vector and the second vector into a long vector, and then determine the performance change ratio of the DBMS based on the long vector.

For ease of understanding, the following illustrates, by using Table 1, performance change ratios estimated by using the solutions of this application when the first knob group, the second knob group, and the data volume of the active data are set to different values.

TABLE 1

Performance Change Ratio Table

| Sample No. | First Knob Group | Second Knob Group | Data Volume of Active Data (GBytes) | Performance Change Ratio |
|---|---|---|---|---|
| 1 | [0.25, 0.2, 0.6, 0.1, 0.3] | [0.5, 0.2, 0.6, 0.1, 0.3] | 0.5 | 1.0 |
| 2 | [0.25, 0.2, 0.6, 0.1, 0.3] | [0.5, 0.2, 0.6, 0.1, 0.3] | 10.0 | 2.0 |
| 3 | [0.25, 0.1, 0.6, 0.1, 0.3] | [0.5, 0.2, 0.3, 0.1, 0.3] | 100 | 2.3 |
| 4 | [0.5, 0.1, 0.6, 0.1, 0.3] | [0.15, 0.02, 0.3, 0.1, 0.3] | 100 | 0.1 |

In Table 1, each of the first knob group and the second knob group includes five knobs. The five knobs may be: innodb_buffer_pool_size, innodb_buffer_pool_chunk_size, innodb_buffer_pool_instances, tmp_table_size, and key_buffer_size.

It can be learned from sample 1 in Table 1 that, when a value of only the first knob in the second knob group is increased, compared with that in the first knob group, to be specific, a value of innodb_buffer_pool_size is adjusted from 0.25 to 0.5, and when the data volume of the active data (0.5 GBytes) is small, DBMS performance is basically the same regardless of whether the first group of knobs or the second group of knobs is used for configuring the DBMS. The performance change ratio is 1, as shown in a result in sample 1, indicating that the DBMS performance remains basically unchanged.

It can be learned from sample 2 that, when a value of only the first knob in the second knob group is increased, compared with that in the first knob group, to be specific, the value of innodb_buffer_pool_size is adjusted from 0.25 to 0.5, and when the data volume of the active data increases (10 GBytes), configuring the DBMS by using the first group of knobs or the second group of knobs leads to a DBMS performance difference. The performance change ratio is 2, indicating that DBMS performance achieved when the DBMS is configured by using the second group of knobs is twice DBMS performance achieved when the DBMS is configured by using the first group of knobs.

It can be learned from sample 3 that, when values of the first and second knobs in the second knob group are increased, compared with those in the first knob group, to be specific, the value of innodb_buffer_pool_size is adjusted from 0.25 to 0.5, and a value of innodb_buffer_pool_chunk_size is adjusted from 0.1 to 0.2, and when the data volume of the active data keeps increasing (100 GBytes), configuring the DBMS by using the first group of knobs or the second group of knobs leads to a slight DBMS performance difference compared with sample 2. The performance change ratio is 2.3, indicating that DBMS performance achieved when the DBMS is configured by using the second group of knobs is 2.3 times DBMS performance achieved when the DBMS is configured by using the first group of knobs.

It can be learned from sample 4 that, when values of the first, second, and third knobs in the second knob group are decreased, compared with those in the first knob group, to be specific, the value of innodb_buffer_pool_size is adjusted from 0.5 to 0.15, the value of innodb_buffer_pool_chunk_size is adjusted from 0.1 to 0.02, and a value of innodb_buffer_pool_instances is adjusted from 0.6 to 0.3, and when knob values of the second knob group are generally less than knob values of the first knob group, DBMS performance deteriorates. The performance change ratio is 0.1, indicating that DBMS performance achieved when the DBMS is configured by using the second group of knobs is 0.1 times DBMS performance achieved when the DBMS is configured by using the first group of knobs.

In this embodiment of this application, the data volume of the active data is included in preprocessing, that is, knob modification, so that input features are reduced, overfitting is avoided, and an estimation result can be sensitive to the data volume. In addition, an output result is a proportional value, which eliminates impact of other factors (such as a system state) on the result.

In embodiments, the estimating first estimated execution duration for the DBMS to execute the SQL statement includes: converting the SQL statement into a third vector; determining a complexity coefficient of the SQL statement based on the third vector; and estimating, based on the complexity coefficient, the first estimated execution duration for the DBMS to execute the SQL statement.

The SQL statement includes a subquery statement, and the converting the SQL statement into a third vector includes: determining complexity of the subquery statement by using a relational expression of complexity and a condition factor, where the condition factor includes a condition type in subquery and a table type related to the subquery; determining a vector of the subquery statement based on the complexity of the subquery statement; inputting the vector of the subquery statement into a cost model to obtain a complexity coefficient of the subquery statement, where a training sample of the cost model includes a vector of a historical SQL statement executed by the DBMS and a complexity coefficient of the historical SQL statement; and determining the third vector of the SQL statement based on the complexity coefficient of the subquery statement and a nesting relationship between the subquery statement and an upper-layer query statement that includes the subquery statement.

The operation of converting the SQL statement into a third vector may be alternatively described as: converting the SQL statement into a statement template according to a preset template rule, where if the SQL statement includes a subquery statement, the statement template includes at least one subtemplate corresponding to the subquery statement; determining complexity of each subtemplate by using a relational expression of complexity and a condition factor, where the condition factor includes a condition type in the subtemplate and a related table type; determining a vector of the subquery statement based on the complexity of each subtemplate; inputting the vector of the subquery statement into a cost model to obtain a complexity coefficient of the subquery statement, where a training sample of the cost model includes a vector of a historical SQL statement executed by the DBMS and a complexity coefficient of the historical SQL statement; and recursively determining the third vector of the SQL statement based on the complexity coefficient of the subquery statement and a recursive relationship between the subquery statement and an upper-layer query statement.

The determining a complexity coefficient of the SQL statement based on the third vector includes: inputting the third vector into the cost model; and determining the complexity coefficient of the SQL statement by using the cost model.

The estimating, based on the complexity coefficient, the first estimated execution duration for the DBMS to execute the SQL statement may include:

estimating, based on the complexity coefficient of the SQL statement and a relational expression of a complexity coefficient and execution duration, the first estimated execution duration for the DBMS to execute the SQL statement; or inputting the complexity coefficient into an execution time modification model, where a training sample of the execution time modification model includes a complexity coefficient of a historical SQL statement executed by the DBMS and execution duration of the historical SQL statement; and determining, by using the execution time modification model, the first estimated execution duration for the DBMS to execute the SQL statement.

Figure 5:
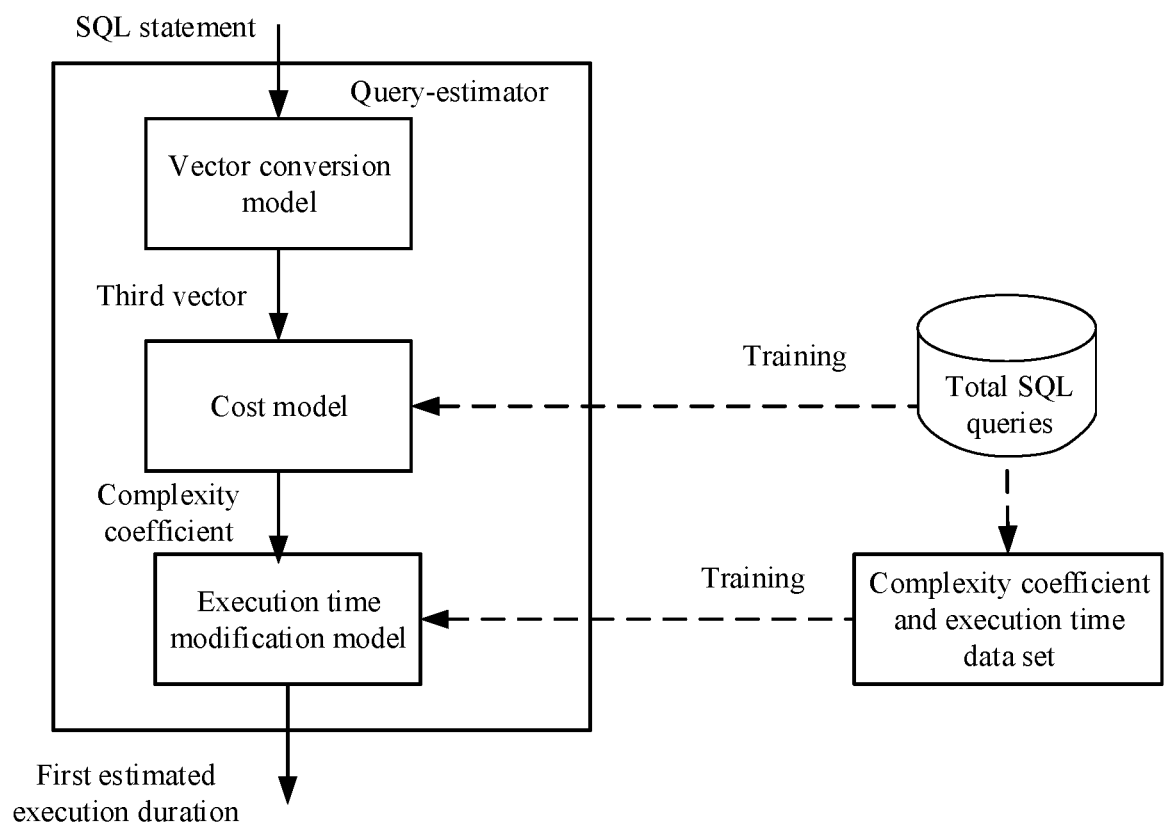
FIG. 5 is a schematic diagram of another embodiment of a method for estimating database management system performance according to an embodiment of this application.

It may be alternatively understood that the query-estimator includes a vector conversion model, the cost model, and the execution time modification model, as shown in FIG. 5. The process of the query-estimator is completed by using the vector conversion model, the cost model, and the execution time modification model.

The cost model is obtained by training a training sample. The training sample of the cost model includes a vector of a historical SQL statement executed by the DBMS and a complexity coefficient of the historical SQL statement.

The execution time modification model is obtained by training a training sample. The training sample of the execution time modification model includes a complexity coefficient of a historical SQL statement executed by the DBMS, and execution duration of the historical SQL statement.

The vector conversion model converts the SQL statement into a statement template according to a preset template rule, where if the SQL statement includes a subquery statement, the statement template includes at least one subtemplate corresponding to the subquery statement; the vector conversion model determines complexity of each subtemplate by using a relational expression of complexity and a condition factor, where the condition factor includes a condition type in the subtemplate and a related table type; and the vector conversion model determines a vector of the subquery statement based on the complexity of each subtemplate.

The vector conversion model inputs the vector of the subquery statement into the cost model to obtain a complexity coefficient of the subquery statement.

The vector conversion model and the cost model recursively determine the third vector of the SQL statement based on the complexity coefficient of the subquery statement and a recursive relationship between the subquery statement and an upper-layer query statement.

Then, the cost model receives the third vector and determines the complexity coefficient of the SQL statement based on the third vector.

Then, the execution time modification model receives the complexity coefficient of the SQL statement and estimates, based on a relational expression of a complexity coefficient and execution duration, the first estimated execution duration for the DBMS to execute the SQL statement.

The process in which the vector conversion model and the cost model convert the SQL statement into the third vector may be understood with reference to the following example.

The SQL statement is as follows:

```
select
    s_acctbal,
    s_name,
    n_name,
    p_partkey,
    p_mfgr,
    s_adress,
    s_phone,
    s_comment
from
    part,
    supplier,
    partsupp,
    natio,
    region
where
    p_partkey= ps_partkey
    and s_suppkey= ps_suppkey
    and p_size=37
    and p_type like %TIN
    and s_nationkey= n_ nationkey
    and n_regionkey= r_ regionkey
    and r_name= ASIA
    and ps_supplycost=(
        select
            min(ps_supplycost)
        from
            partsupp,
            supplier,
            nation,
            region
        where
            p_partkey= ps_partkey
            and s_suppkey= ps_suppkey
            and s_nationkey= n_ nationkey
            and n_regionkey= r_ regionkey
            and r_name= ASIA
    )
order by
    n_name,
    s_name,
limit 100
```

The SQL statement is a very complex SQL statement, and a statement template of the SQL statement may be: Select*from where {select*from*where; +min}+order by+limit.

The operation of converting the SQL statement into a vector may include: identifying subtemplates in a bottommost-layer subquery statement {select*from*where; +min} in the SQL statement, where the bottommost-layer subquery statement includes two subtemplates: "select*from*where;" and "min". A process of calculating complexity of each subtemplate is described by using "select*from*where;" as an example.

The relational expression of complexity and a condition factor may be understood with reference to the following relational expression:

$$complex\_factor = table\_nums * 1 + sum(condition\_factor)$$

In the relational expression, complex factor indicates complexity of a subtemplate, table_num indicates a quantity of table types related to the subtemplate, condition_factor indicates a condition type coefficient in the subtemplate, and sum indicates summation. Certainly, if the relational expression is applied to an uppermost-layer template, the knobs described above indicate complexity, a quantity of table types, a condition type coefficient, and the like that are of the uppermost-layer template.

For condition_factor, the "where" condition in the subtemplate "select*from*where;" is used as an example. For example, various condition type coefficients in the subtemplate may be set to values listed in Table 2.

TABLE 2

Condition Type Coefficient Table

| Equivalence Condition | 0.5 |
| Non-equivalence Condition | 0.7 |
| Range Query | 0.3 |
| Equivalence Condition | 0.5 |
| Related Subquery | Complex factor of the subquery |

From the subtemplate "select*from*where;", it can be learned that "from" includes four table types: partsupp, supplier, nation, and region. In this case, it can be determined, based on table_nums*1, that complexity at "from" in the subtemplate is: 4×1=4. There are five equivalence conditions at "where" in the subtemplate, which are: p_partkey=ps_partkey, s_suppkey=ps_suppkey, s_nationkey=n_nationkey, n_regionkey=r_regionkey, and r_name=ASIA. In this case, it can be determined, based on sum(condition_factor) and the equivalence condition coefficient 0.5 that is listed in Table 2, that complexity at "where" in the subtemplate is: 5×0.5=2.5.

Based on the foregoing relational expression of complexity of the subtemplate, it can be determined that complexity of the subtemplate is: 4+5×0.5=6.5.

Similarly, because the subtemplate "min" only includes the condition ps_supplycost, complexity of the subtemplate "min" is 1.

Elements in vectors in all dimensions are 0 when the subquery statement {select*from*where; +min} is initialized. Therefore, after the complexity of the subtemplate "select*from*where;" and the complexity of the subtemplate "min" are calculated, a vector v1 of the subquery statement may be obtained by replacing 0s in vectors in corresponding dimensions that are set when the subquery statement is initialized with the complexity values of the two subtemplates. For example, the vector v1 of the subquery statement may be [0, 0, 6.5, 0, 1, 00 . . . 0].

After the vector v1 of the subquery statement is obtained, the vector v1 is input into the cost model, and the cost model outputs a complexity coefficient c1 corresponding to the subquery statement. Then, recursive calculation is performed according to relationships between subquery statements at various layers in the SQL statement. The third vector of the SQL statement can be obtained through calculation by repeating a process similar to the foregoing process of the subquery statement {select*from*where; +min}.

Then, the third vector is also input into the cost model, and the complexity coefficient of the SQL statement can be obtained.

The execution time modification model includes a relational expression of a complexity coefficient and execution duration. Therefore, after receiving the complexity coefficient of the SQL statement, the time modification model can estimate, according to the relational expression, the first estimated execution duration for the DBMS to execute the SQL statement.

It should be noted that the foregoing complexity calculation formula is provided by using an addition relationship, which is only an example actually. Another arithmetic relationship such as subtraction, division, or multiplication may also be applied to the foregoing complexity calculation process in this application.

To facilitate description of accuracy of the first estimated execution duration estimated by using this embodiment of this application, a group of comparative data in Table 3 is provided in the following.

TABLE 3

Duration Comparison Table

| SQL Statement | Statement Structure | Vector | Complexity Coefficient | Estimated Execution Duration | Actual Execution Duration |
| --- | --- | --- | --- | --- | --- |
| select i_data from bmsql_item limit 260; | SELECT * FROM *; LIMIT {VALUE}; | [0, 0, 1, 0, 0, . . . , 0] | 0.1 | 1 | 1.2 |
| delete from house where city = 'BJ'; | DELETE FROM * WHERE * = *; | [0, 1, 0, 0, . . . , 0] | 0.1 | 1 | 1.5 |
| SQL Statement | Statement Structure | Vector | Complexity Coefficient | Estimated Execution Duration | Actual Execution Duration |
| Update house set city = 'BJ' where street = 'SD'; | UPDATE * SET * = * WHERE * = *. | [0, 0, 0, 1, . . . , 0] | 0.2 | 2 | 1.9 |
| insert into tab (id, color) values (10, 'red') | INSERT INTO * VALUES *; | [1, 0, 0, 0, . . . , 0] | 0.15 | 2 | 2.5 |

As shown in each row of Table 3, when different SQL statements are input, estimated execution duration obtained by using the solutions provided in the embodiments of this application is not much different from actual execution duration for the DBMS to actually execute the SQL statement in each row. It can be learned that high accuracy of estimated execution duration is achieved by using the solutions provided in the embodiments of this application. In this way, self-tuning and self-management of the DBMS can be implemented by using the solutions provided in this application.

Figure 6:
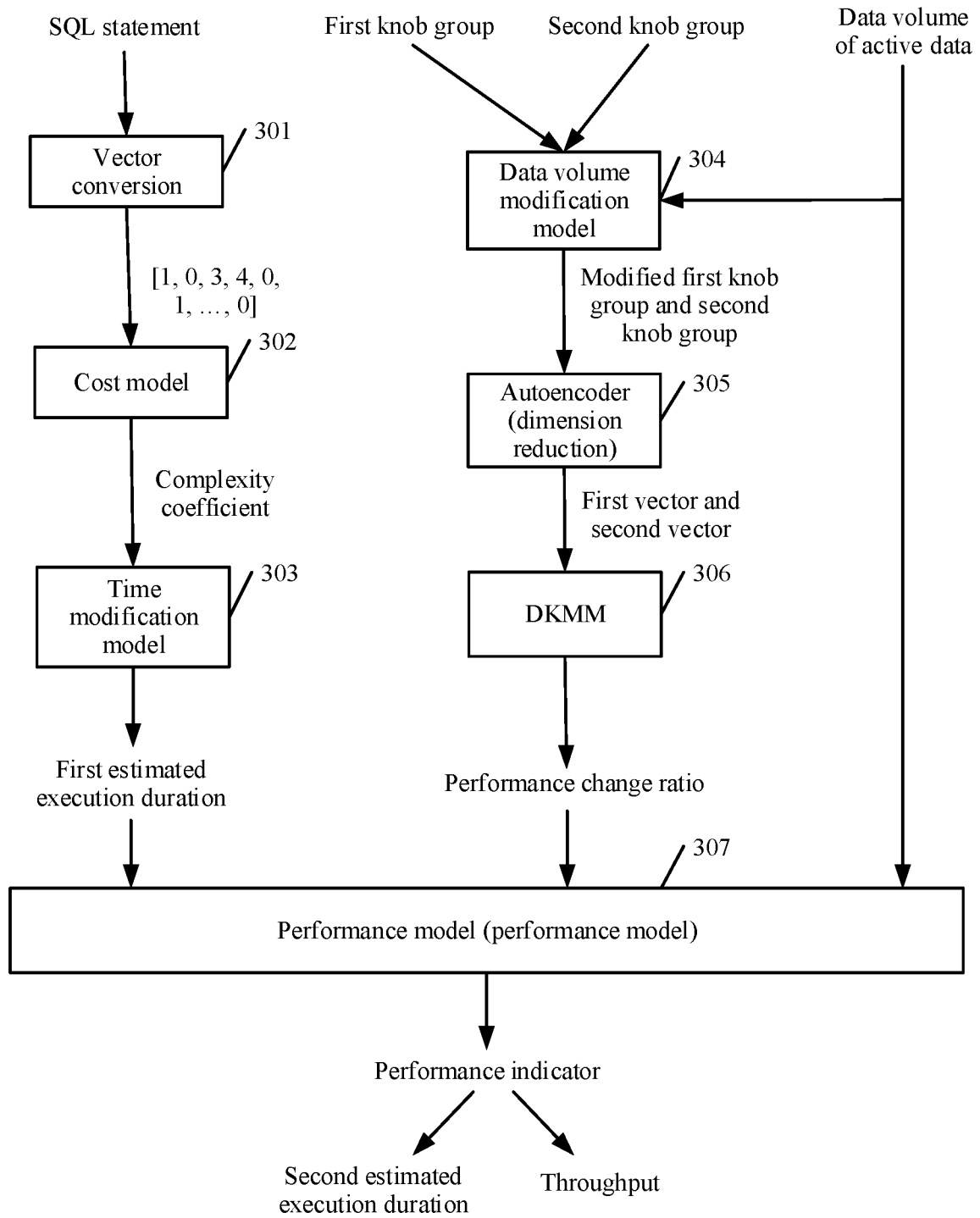
FIG. 6 is a schematic diagram of another embodiment of a method for estimating database management system performance according to an embodiment of this application.

For better understanding of a process of estimating database management system performance provided in the embodiments of this application, the estimation process is described in the following with reference to FIG. 6.

301: A vector conversion model performs vector conversion on a SQL statement input by a user, and outputs a post-conversion vector.

The post-conversion vector may be, for example, [1, 0, 3, 4, 0, 1, . . . , 0].

302: A cost conversion model determines a complexity coefficient of the SQL statement based on the post-conversion vector.

303: A time modification model determines first estimated execution duration based on the complexity coefficient determined in operation 302.

The process from operation 301 to operation 303 may be understood with reference to corresponding content of the embodiment corresponding to FIG. 5. Details are not described herein.

304: A data volume modification module receives a first knob group, a second knob group, and a data volume of active data, and then modifies knobs in the first knob group and second knob group based on the data volume.

305: An autoencoder performs dimension reduction on the modified first knob group and second knob group, to convert vectors in a high dimension into a first vector and a second vector that are in a low dimension.

306: A DKMM determines a performance change ratio based on the first vector and the second vector.

The process from operation 304 to operation 306 may be understood with reference to corresponding content of the embodiment corresponding to FIG. 4. Details are not described herein.

307: A performance estimator receives the first estimated execution duration output in operation 303, the performance change ratio output in operation 306, and the data volume of the active data, and then performs performance estimation based on the first estimated execution duration, the performance change ratio, and the data volume of the active data, to obtain a performance indicator. The performance indicator may include at least one of second estimated execution duration and a throughput.

The second estimated execution duration and the throughput that are output by the performance estimator may be presented on a user interface (UI) of a terminal device. A presentation form may be understood with reference to FIG. 7.

Figure 7:
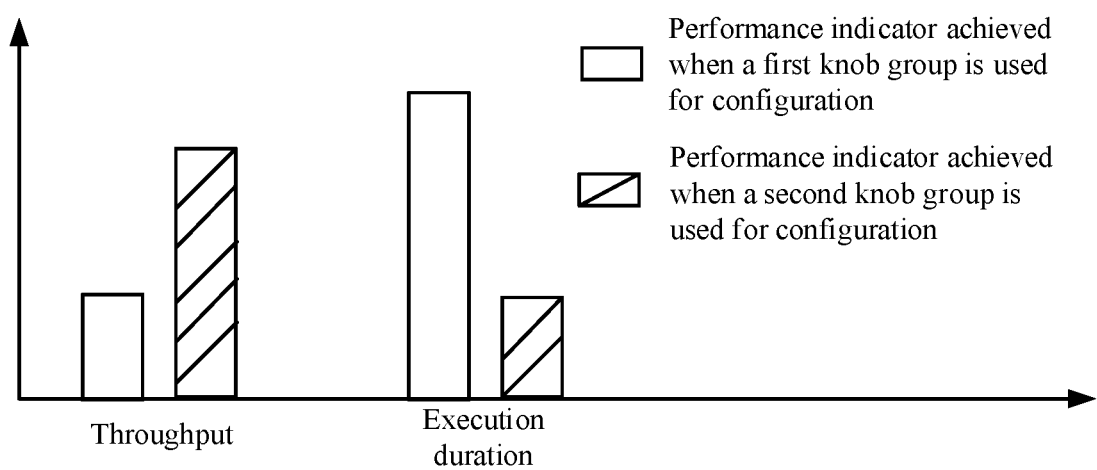
FIG. 7 is a schematic diagram of an interface for comparing performance indicators according to an embodiment of this application.

As shown in FIG. 7, in terms of a throughput, a throughput achieved when a DBMS is configured by using the first knob group is far lower than a throughput achieved when the DBMS is configured by using the second knob group. In terms of execution duration, execution duration for executing a SQL statement when the DBMS is configured by using the first knob group is much longer than execution duration for executing the same SQL statement when the DBMS is configured by using the second knob group. Therefore, a knob group used for updating the DBMS may be determined according to an estimation result in this application. In this way, configuration can be performed with a predicted effect, without a need for configuration first, effect checking next, and modification then. In this way, precision of DBMS knob configuration can be effectively improved, and stability of the DBMS is improved.

Figure 8:
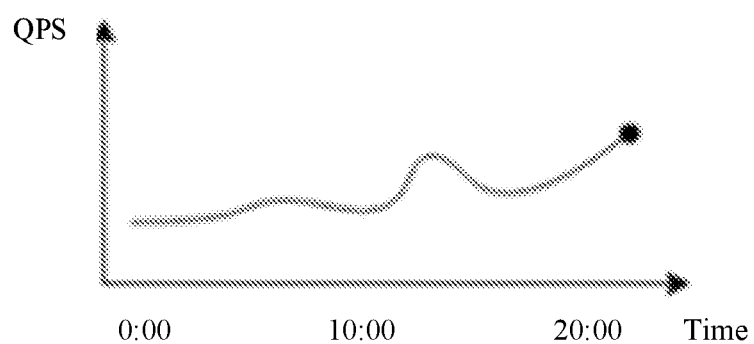
FIG. 8 is a schematic diagram of an interface of a query ratio trend according to an embodiment of this application.

In this embodiment of this application, the throughput may further reflect information about queries per second (QPS). In this case, according to a trend of the QPS, the user may further perceive a performance change range within a period of time after the DBMS is configured by using the second knob group. The trend of the QPS may be understood with reference to FIG. 8. As shown in FIG. 8, the QPS shows a steady growth trend after a period of small fluctuations, indicating that the performance is improved after the DBMS is configured by using the second knob group.

The foregoing apparatus for estimating database management system performance is independent of the DBMS. Actually, the apparatus for estimating database management system performance may be alternatively integrated into the DBMS. A database server integrated into the DBMS is described in the following with reference to FIG. 9.

Figure 9:
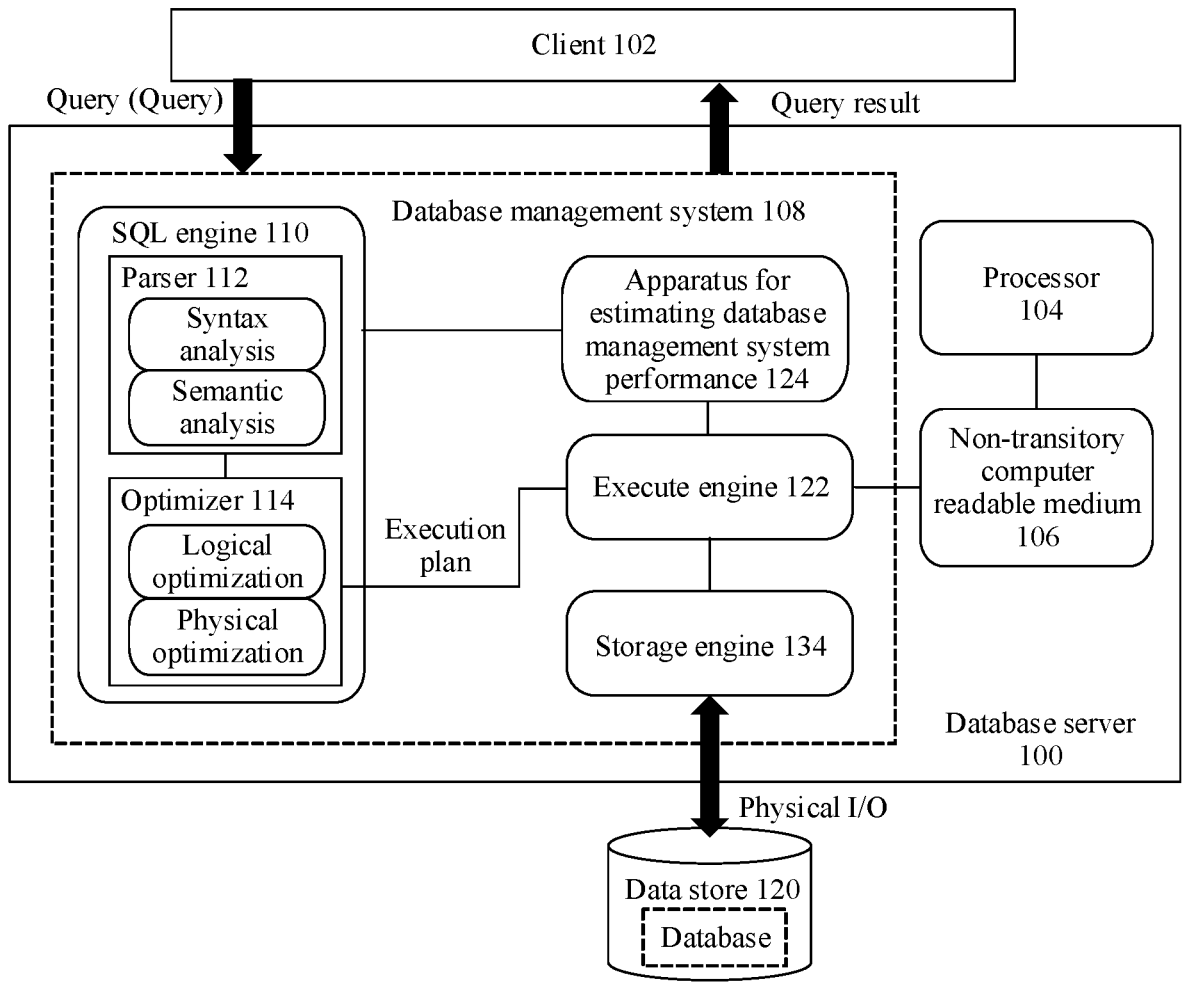
FIG. 9 is a schematic diagram of an embodiment of a database server according to an embodiment of this application.

As shown in FIG. 9, an embodiment of the present disclosure provides a database server 100, including at least one processor 104, a non-transitory computer-readable medium 106 storing executable code, and a database management system 108. The executable code is configured to implement a component and a function of the database management system 108 when executed by the at least one processor 104. The non-transitory computer readable medium 106 may include one or more non-volatile memories. As an example, the non-volatile memory includes a semiconductor storage device, such as an erasable programmable read only memory (EPROM), an electrically erasable read only memory (EEPROM) and flash memory, a disk, such as an internal hard disk or a removable disk, a magnetic optical disk, a CD ROM, and a DVD-ROM. In addition, the non-transitory computer-readable medium 106 may further include any device configured as a main memory. The at least one processor 104 may include any type of general-purpose computing circuit or special-purpose logic circuit, such as a field-programmable gate array (FPGA) or an application specific integrated circuit (ASIC). The at least one processor 104 may alternatively be one or more processors coupled to one or more semiconductor substrates, such as a CPU.

The database management system 108 may be a relational database management system (RDBMS). The database management system 108 supports a structured query language (SQL). Usually, the SQL is a dedicated programming language dedicated for managing data stored in a relational database. The SQL may be any type of a data-related language, including a data definition language and a data control language. Functions of the SQL may include data insertion, query, updating, and deletion, mode creation and modification, and data access control. In addition, in some examples, the SQL may include description related to various language elements, including a clause, an expression, a predicate, a query, and a statement. For example, the clause may be various constituents of the statement and the query. In addition, in some cases, it is considered that the clause is optional. In addition, the expression may be configured to generate a scalar value and/or a table including a data column and/or row. In addition, the predicate may be configured with a specified condition, to adjust an effect of the statement and the query.

The query is used to request to view, access and/or manipulate data stored in the database. The database management system 108 may receive a query in an SQL format (referred to as SQL query) from a database client 102. The SQL query may also be referred to as a SQL statement. Usually, the database management system 108 generates, by accessing related data and manipulating the related data in the database, a query result corresponding to the query, and returns the query result to the database client 102. A database is a set of data organized, described, and stored according to a mathematical model. The database may include one or more database structures or formats, such as row storage and column storage. The database is usually stored in a data store, such as an external data store 120 or the non-transitory computer-readable medium 106 in FIG. 9. When the database is stored in the non-transitory computer-readable medium 106, the database management system 108 is a memory database management system.

The database client 102 may include any type of a device or application configured to interact with the database management system 108. In some examples, the database client 102 includes one or more application servers.

The database management system 108 includes a SQL engine 110, an execute engine 122, a storage engine 134, and an apparatus 124 for estimating database management system performance in this embodiment of this application. The SQL engine 110 generates a corresponding execute plan based on an SQL statement submitted by the client 102, such as a query. The execute engine 122 performs an operation based on the execute plan of the statement, to generate a query result. The storage engine 134 is responsible for managing data of a table and actual content of an index in a file system, and also manages data such as data in a cache, data in a buffer, a transaction, and a log during running of the storage engine 134. For example, the storage engine 134 may write an execution result of the execute engine 122 into the data store 120 by using physical I/O. The SQL engine 110 includes a parser 112 and an optimizer 114. The parser 110 is configured to perform syntax and semantic analysis on the SQL statement, expand a query view, and obtain smaller query blocks through division. The optimizer 114 generates, for the statement, a group of execute plans that are possibly used, estimates costs of each execute plan, compares costs of the plans, and finally selects a least-cost execute plan. The apparatus 124 for estimating database management system performance may obtain historical data of the DBMS from the SQL engine 110 and the execute engine 122, for example, historical configuration knobs of the DBMS and execution duration of historical SQL statements.

It can be learned from the foregoing description that the method for estimating database management system performance provided in the embodiments of this application may be implemented by using the apparatus for estimating database management system performance, and the apparatus for estimating database management system performance may be integrated into the DBMS 108 described above or independent of the DBMS 108 described above. Regardless of whether the apparatus for estimating database management system performance is integrated into the DBMS or independent of the DBMS, the apparatus for estimating database management system performance can estimate performance of the DBMS without interacting with the DBMS. In this way, performance measurement approaches are provided for self-tuning and self-management of a database, and reliable and stable running of the DBMS is ensured. A method for estimating database management system performance provided in an embodiment of this application is described in the following. The apparatus for estimating database management system performance may be one or more servers, may be a physical machine, or may be a virtual machine (VM).

The method and the database system provided in the embodiments of this application are described above. An apparatus for estimating database management system performance provided in an embodiment of this application is described in the following with reference to the accompanying drawings.

Figure 10:
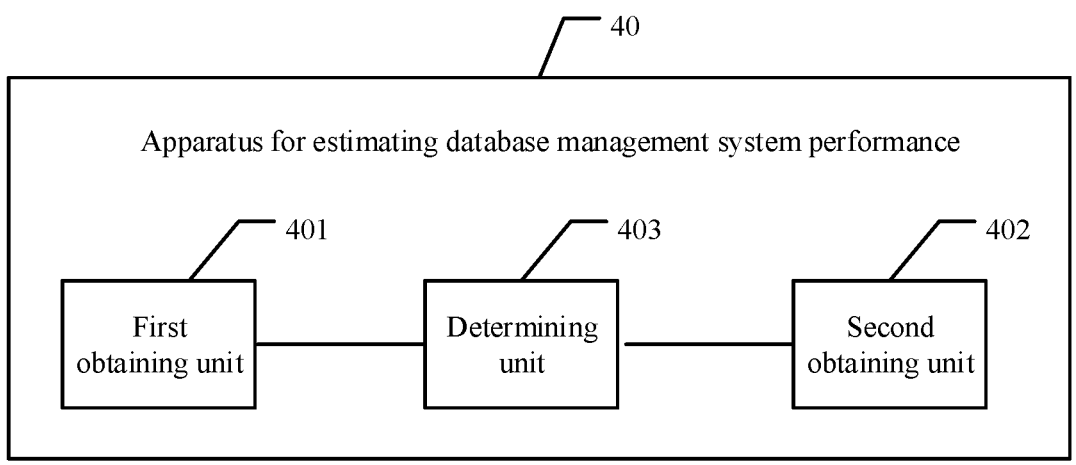
FIG. 10 is a schematic diagram of an embodiment of an apparatus for estimating database management system performance according to an embodiment of this application.

As shown in FIG. 10, an embodiment of an apparatus 40 for estimating database management system performance provided in an embodiment of this application includes:

a first obtaining unit 401, configured to obtain a first knob group configured for a database management system DBMS, and obtain a data volume of active data in data managed by the DBMS, where the first knob group includes at least one knob;

a second obtaining unit 402, configured to obtain a second knob group, where the second knob group includes at least one knob; and a determining unit 403, configured to determine a performance change ratio of the DBMS based on the first knob group and the data volume of the active data that are obtained by the first obtaining unit 401, and the second knob group obtained by the second obtaining unit 402, where the performance change ratio indicates a change degree of DBMS performance achieved after the DBMS is configured by using the second knob group compared with DBMS performance achieved when the DBMS is configured by using the first knob group.

In the solutions provided in this embodiment of this application, the performance change ratio of the DBMS can be determined once the first knob group, the second knob group, and the data volume of the active data in the data managed by the DBMS are obtained, without actually configuring the second knob group in the DBMS, executing a job by the DBMS, and then observing the execution. In other words, the performance change ratio of the DBMS can be estimated without interacting with the DBMS. DBMS security can be ensured, performance measurement approaches are provided for self-tuning and self-management of the DBMS, and reliable and stable running of the DBMS is ensured.

Figure 11:
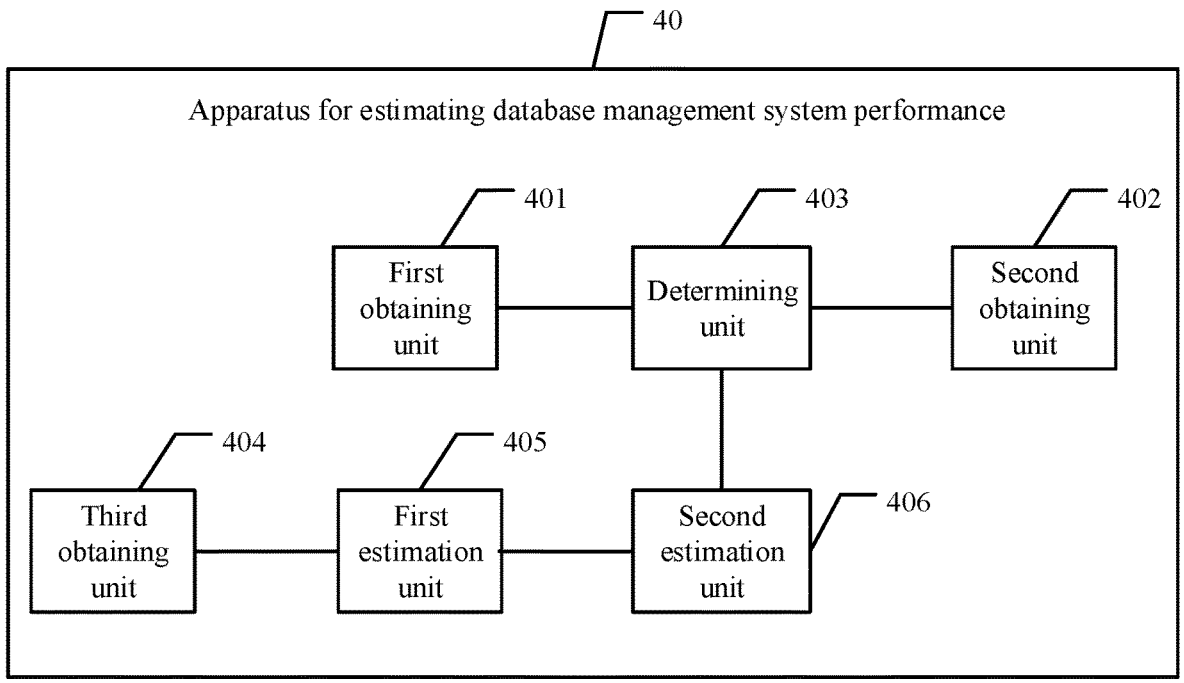
FIG. 11 is a schematic diagram of another embodiment of an apparatus for estimating database management system performance according to an embodiment of this application.

In a possible embodiment, as shown in FIG. 11, the apparatus 40 further includes: a third obtaining unit 404 and a first estimation unit 405.

The third obtaining unit 404 is configured to obtain a structured query language SQL statement.

The first estimation unit 405 is configured to estimate first estimated execution duration for the DBMS to execute the SQL statement obtained by the third obtaining unit.

In a possible embodiment, as shown in FIG. 11, the apparatus 40 further includes a second estimation unit 406.

The second estimation unit 406 is configured to estimate a performance indicator of the DBMS based on the performance change ratio of the DBMS determined by the determining unit, the first estimated execution duration that is estimated by the first estimation unit, and the data volume of the active data obtained by the first obtaining unit, where the performance indicator includes at least one of second estimated execution duration of the SQL statement and a throughput of the DBMS, and the second estimated execution duration is a modification value of the first estimated execution duration.

In a possible embodiment, the second estimation unit 406 is configured to: input the performance change ratio of the DBMS, the first estimated execution duration, and the data volume of the active data into a performance estimator, where a training sample of the performance estimator includes a historical performance change ratio of the DBMS, execution duration of a historical SQL statement, and a data volume of active data managed by the DBMS and a historical performance indicator that are obtained when the DBMS executes the historical SQL statement; and estimate the performance indicator of the DBMS by using the performance estimator.

In a possible embodiment, the determining unit 403 is configured to: modify, based on the data volume of the active data in the DBMS, knobs that are in the first knob group and the second knob group and that are related to the data volume of the active data; perform dimension reduction on the modified first knob group and second knob group to obtain a first vector and a second vector, where the first knob group is a vector whose dimension is higher than that of the first vector, and the second knob group is a vector whose dimension is higher than that of the second vector; and determine the performance change ratio of the DBMS based on the first vector and the second vector.

In a possible embodiment, the determining unit 403 is configured to: adjust target knobs that are in the first knob group and the second knob group and that are related to the data volume of the active data to be equal to the data volume of the active data, where the target knobs are knobs that are in the first knob group and the second knob group and that are greater than the data volume of the active data.

In a possible embodiment, the determining unit 403 is configured to: input the first vector and the second vector into a double knobs mixture model, where a training sample of the double knobs mixture model includes a plurality of pairs of first historical knob groups and second historical knob groups that have been configured for the DBMS, and a performance change ratio that is of the DBMS and that is corresponding to each pair of first historical knob group and second historical knob group; and determine the performance change ratio of the DBMS by using the double knobs mixture model.

In a possible embodiment, the first estimation unit 405 is configured to: convert the SQL statement into a third vector; determine a complexity coefficient of the SQL statement based on the third vector; and estimate, based on the complexity coefficient, the first estimated execution duration for the DBMS to execute the SQL statement.

In a possible embodiment, the SQL statement includes a subquery statement, and the first estimation unit 405 is configured to: determine complexity of the subquery statement by using a relational expression of complexity and a condition factor, where the condition factor includes a condition type in subquery and a table type related to the subquery; determine a vector of the subquery statement based on the complexity of the subquery statement; input the vector of the subquery statement into a cost model to obtain a complexity coefficient of the subquery statement, where a training sample of the cost model includes a vector of a historical SQL statement executed by the DBMS and a complexity coefficient of the historical SQL statement; and determine the third vector of the SQL statement based on the complexity coefficient of the subquery statement and a nesting relationship between the subquery statement and an upper-layer query statement that includes the subquery statement.

In a possible embodiment, the first estimation unit 405 is configured to: convert the SQL statement into a statement template according to a preset template rule, where if the SQL statement includes a subquery statement, the statement template includes at least one subtemplate corresponding to the subquery statement; determine complexity of each subtemplate by using a relational expression of complexity and a condition factor, where the condition factor includes a condition type in the subtemplate and a related table type; determine a vector of the subquery statement based on the complexity of each subtemplate; input the vector of the subquery statement into a cost model to obtain a complexity coefficient of the subquery statement, where a training sample of the cost model includes a vector of a historical SQL statement executed by the DBMS and a complexity coefficient of the historical SQL statement; and recursively determine the third vector of the SQL statement based on the complexity coefficient of the subquery statement and a recursive relationship between the subquery statement and an upper-layer query statement.

In a possible embodiment, the first estimation unit 405 is configured to: input the third vector into the cost model; and determine the complexity coefficient of the SQL statement by using the cost model.

In a possible embodiment, the first estimation unit 405 is configured to: estimate, based on the complexity coefficient of the SQL statement and a relational expression of a complexity coefficient and execution duration, the first estimated execution duration for the DBMS to execute the SQL statement.

In a possible embodiment, the first estimation unit 405 is configured to: input the complexity coefficient into an execution time modification model, where a training sample of the execution time modification model includes a complexity coefficient of a historical SQL statement executed by the DBMS and execution duration of the historical SQL statement; and determine, by using the execution time modification model, the first estimated execution duration for the DBMS to execute the SQL statement.

Figure 12:
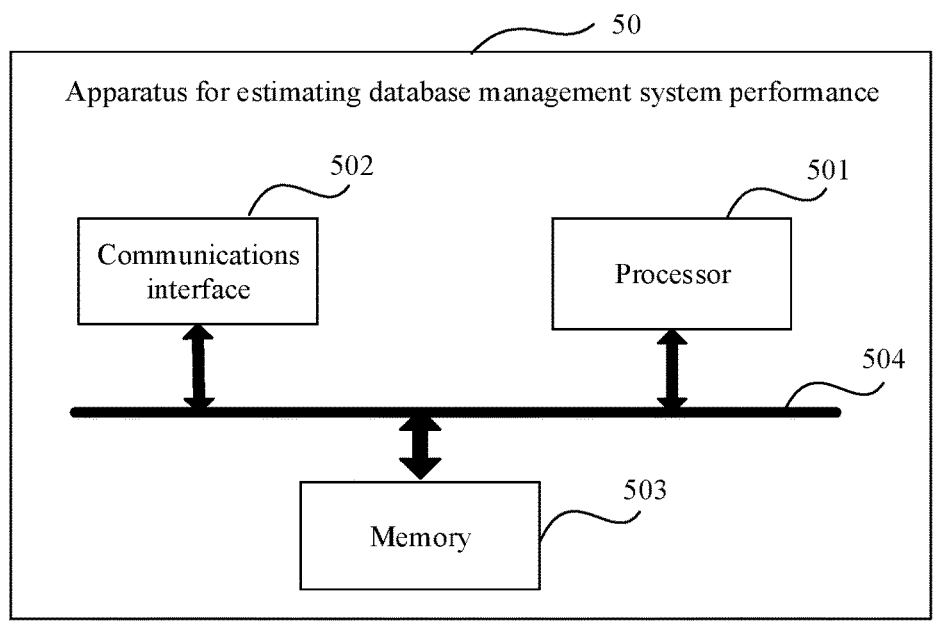
FIG. 12 is a schematic diagram of another embodiment of an apparatus for estimating database management system performance according to an embodiment of this application.

FIG. 12 is a schematic diagram of a possible logical structure of an apparatus 50 for estimating database management system performance that is related to the foregoing embodiments and that is provided in an embodiment of this application. The apparatus 50 for estimating database management system performance includes a processor 501, a communications interface 502, a memory 503, and a bus 504. The processor 501, the communications interface 502, and the memory 503 are connected to each other by using the bus 504. In this embodiment of this application, the processor 501 is configured to control and manage an action of the apparatus 50 for estimating database management system performance. For example, the processor 501 is configured to perform operations 201 to 203 in FIG. 2, operations 301 to 307 in FIG. 6, and/or another process of the technology described in this specification. The communications interface 502 is configured to support the apparatus 50 for estimating database management system performance in communication. For example, the communications interface 502 may perform the operations of receiving the first knob group, the second knob group, the data volume of the active data, and the SQL statement in the foregoing method embodiments. The memory 503 is configured to store program code and data of the database server 50.

The processor 501 may be a central processing unit, a general-purpose processor, a digital signal processor, an application-specific integrated circuit, a field programmable gate array or another programmable logic device, a transistor logic device, a hardware component, or any combination thereof. The processor 2001 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 504 may be a peripheral component interconnect (PCI) bus, an extended industry standard architecture (EISA) bus, or the like. Buses may be classified into an address bus, a data bus, a control bus, and the like. For ease of indication, only one thick line is used to represent in FIG. 12, but it does not mean that there is only one bus or only one type of bus.

Figure 13:
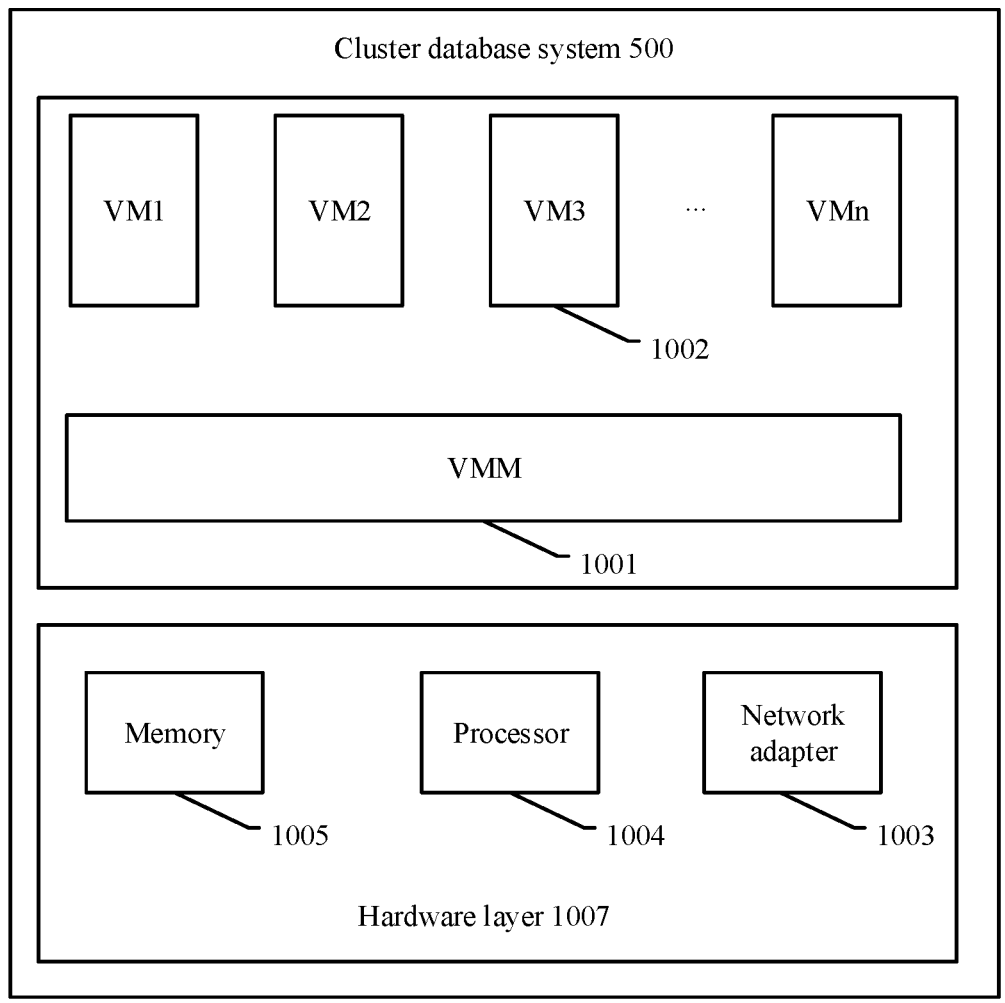
FIG. 13 is a schematic diagram of an embodiment of a cluster database system according to an embodiment of this application.

Referring to FIG. 13, an embodiment of this application further provides a cluster database system 500, including a hardware layer 1007, a virtual machine monitor (VMM) 1001 running above the hardware layer 1007, and a plurality of virtual machines 1002. One virtual machine may be used as a data node of the cluster database system 500. In embodiments, one virtual machine may be further specified as a coordinator node.

Specifically, the virtual machine 1002 is a virtual computer simulated on a common hardware resource by using virtual machine software. An operating system and an application may be installed on the virtual machine, and the virtual machine may further access a network resource. For an application program running on the virtual machine, the virtual machine works like a real computer.

The hardware layer 1007 is a hardware platform running in virtual environment, and may be obtained by abstracting hardware resources of one or more physical machines. The hardware layer may include various types of hardware. For example, the hardware layer includes a processor 1004 (for example, a CPU) and a memory 1005, and may further include a network adapter 1003 (for example, an RDMA network adapter), a high-speed/low-speed input/output (I/O, Input/Output) device, and another device with a specific processing function.

The virtual machine 1002 runs an executable program based on the VMM and hardware resources provided by the hardware layer 1007, to implement some or all functions of the apparatus for estimating database management system performance in the embodiments related to FIG. 3 to FIG. 9. For ease of brevity, details are not described herein again.

Further, the cluster database system 500 may further include a host (Host). The host, serving as a management layer, is configured to manage and allocate hardware resources, present a virtual hardware platform for the virtual machine, and implement scheduling and isolation for the virtual machine. The host may be a virtual machine monitor (VMM) or a combination of a VMM and one privileged virtual machine. The virtual hardware platform provides various hardware resources for the virtual machines running on the virtual hardware platform. For example, the virtual hardware platform provides a virtual processor (for example, a VCPU), a virtual memory, a virtual disk, a virtual network adapter, or the like. The virtual disk may be corresponding to a file or a logical block device of the host. The virtual machines run on the virtual hardware platform that is prepared by the host for the virtual machines, and one or more virtual machines run on the host. A VCPU of the virtual machine 1002 executes an executable program stored in a virtual memory corresponding to the VCPU, to implement or execute the method operations described in the foregoing method embodiments of the present disclosure, for example, to implement some or all functions of the apparatus for estimating database management system performance in the embodiments related to FIG. 3 to FIG. 9.

Figure 14:
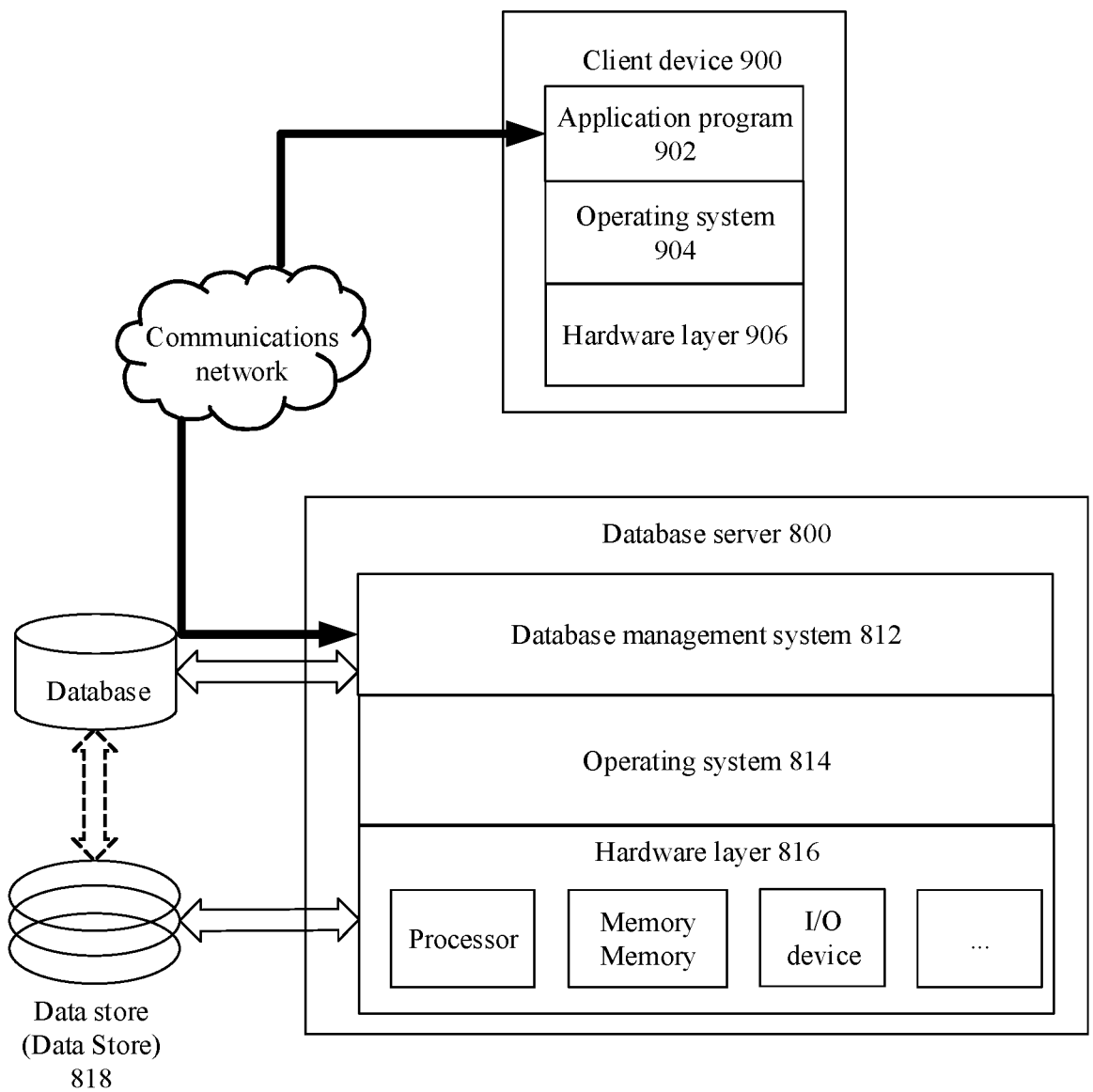
FIG. 14 is a schematic diagram of another embodiment of a database system according to an embodiment of this application.

Referring to FIG. 14, an embodiment of this application further provides a database system, including: a database server 800 and a client device 900 that is connected to the database server 800 by using a communications network.

A client operating system 904 runs at a hardware layer 906 of the client device 900, and an application program 902 runs in the operating system 904. An operating system 814 runs at a hardware layer 816 of the database server 800, and a database management system 812 runs in the operating system 814. The application 902 is connected to, by using the communications network, the database management system 812 running on the database server 800, and accesses or operates a database stored in a data store 818, for example, queries, updates, or deletes data in the database by using an SQL statement, or imports new data into the database.

The hardware layers 906 and 816 include basic hardware units required for running the operating system and the application, for example, include a processor such as a CPU, a memory, an input/output device, and a network interface.

The data store 818 may be an external storage of the database server 800, such as a hard disk, a magnetic disk, a storage array, or a storage server, and is communicatively connected to the database server 800. Alternatively, the data store 818 may be internally integrated into the database server 800, and exchange data with a processor and an I/O device by using a bus or in another communication manner.

A memory of the database server 800 stores executable code, and when executed by the processor, the executable code is configured to implement a component and a function of the database management system 812. The database management system 812 may be specifically the database management system 108 shown in FIG. 2. For a related function and embodiment details, refer to the embodiments in FIG. 3 to FIG. 9. Details are not described herein again.

In another embodiment of this application, a computer readable storage medium is further provided. The computer readable storage medium stores computer executable instructions. When at least one processor of a device executes the computer executable instructions, the device performs the method for estimating database management system performance described in some of the embodiments related to FIG. 3 to FIG. 9.

In another embodiment of this application, a computer program product is further provided. The computer program product includes computer executable instructions, and the computer executable instructions are stored in a computer readable storage medium. At least one processor of a device may read the computer executable instructions from the computer readable storage medium, and the at least one processor executes the computer executable instructions, so that the device performs the method for estimating database management system performance described in some of the embodiments related to FIG. 3 to FIG. 9.

A person of ordinary skill in the art may be aware that, in combination with the examples described in the embodiments disclosed in this specification, units and algorithm operations can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the embodiment goes beyond the scope of the embodiments of this application.

It may be clearly understood by the person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the unit division is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of the embodiments of this application shall be subject to the protection scope of the claims.

What is claimed is:

1. A method for estimating database management system performance, comprising:
    obtaining a first knob group configured for a database management system (DBMS), and obtaining a first data volume of active data in data managed by the DBMS, wherein the first knob group comprises at least one first knob;
    obtaining a second knob group, wherein the second knob group comprises at least one second knob;
    determining a performance change ratio of the DBMS based on the first knob group, the second knob group, and the first data volume of the active data, wherein the performance change ratio indicates a change degree of DBMS performance achieved after the DBMS is configured using the second knob group compared with DBMS performance achieved when the DBMS is configured using the first knob group; and
    estimating a performance indicator of the DBMS based on the performance change ratio of the DBMS, a first estimated execution duration for the DBMS to execute a structured query language (SQL) statement, and the first data volume of the active data, wherein the performance indicator comprises at least one of second estimated execution duration of the SQL statement and a throughput of the DBMS, and the second estimated execution duration is a modification value of the first estimated execution duration.

2. The method according to claim 1, wherein the estimating the performance indicator of the DBMS based on the performance change ratio of the DBMS, the first estimated execution duration, and the first data volume of the active data comprises:
    inputting the performance change ratio of the DBMS, the first estimated execution duration, and the first data volume of the active data into a performance estimator, wherein a training sample of the performance estimator comprises a historical performance change ratio of the DBMS, execution duration of a historical SQL statement, and a second data volume of active data and a historical performance indicator that are obtained when the DBMS executes the historical SQL statement; and
    estimating the performance indicator of the DBMS using the performance estimator.

3. The method according to claim 1, wherein the determining the performance change ratio of the DBMS based on the first knob group, the second knob group, and the first data volume of the active data comprises:
    modifying, based on the first data volume of the active data in the DBMS, knobs that are in the first knob group and the second knob group and that are related to the first data volume of the active data;
    performing dimension reduction on the modified first knob group and second knob group to obtain a first vector and a second vector, wherein the first knob group is a vector whose dimension is higher than that of the first vector, and the second knob group is a vector whose dimension is higher than that of the second vector; and
    determining the performance change ratio of the DBMS based on the first vector and the second vector.

4. The method according to claim 3, wherein the modifying, based on the first data volume of the active data in the DBMS, knobs that are in the first knob group and the second knob group and that are related to the first data volume of the active data comprises:
    adjusting target knobs that are in the first knob group and the second knob group and that are related to the first data volume of the active data to be equal to the first data volume of the active data, wherein the target knobs are knobs that are in the first knob group and the second knob group and that are greater than the first data volume of the active data.

5. The method according to claim 3, wherein the determining the performance change ratio of the DBMS based on the first vector and the second vector comprises:
    inputting the first vector and the second vector into a double knobs mixture model, wherein a training sample of the double knobs mixture model comprises a plurality of pairs of first historical knob groups and second historical knob groups that have been configured for the DBMS, and a performance change ratio that is of the DBMS and that is corresponding to each pair of first historical knob group and second historical knob group; and
    determining the performance change ratio of the DBMS using the double knobs mixture model.

6. The method according to claim 1, wherein the estimating first estimated execution duration for the DBMS to execute the SQL statement comprises:
converting the SQL statement into a third vector;
determining a complexity coefficient of the SQL statement based on the third vector; and
estimating, based on the complexity coefficient, the first estimated execution duration for the DBMS to execute the SQL statement.

7. The method according to claim 6, wherein the SQL statement comprises a subquery statement, and the converting the SQL statement into the third vector comprises:
determining complexity of the subquery statement using a relational expression of complexity and a condition factor, wherein the condition factor comprises a condition type in the subquery and a table type related to the subquery;
determining a vector of the subquery statement based on the complexity of the subquery statement;
inputting the vector of the subquery statement into a cost model to obtain a complexity coefficient of the subquery statement, wherein a training sample of the cost model comprises a vector of a historical SQL statement executed by the DBMS and a complexity coefficient of the historical SQL statement; and
determining the third vector of the SQL statement based on the complexity coefficient of the subquery statement and a nesting relationship between the subquery statement and an upper-layer query statement that comprises the subquery statement.

8. The method according to claim 6, wherein the determining the complexity coefficient of the SQL statement based on the third vector comprises:
inputting the third vector into a cost model; and
determining the complexity coefficient of the SQL statement using the cost model.

9. The method according to claim 6, wherein the estimating, based on the complexity coefficient, the first estimated execution duration for the DBMS to execute the SQL statement comprises:
estimating, based on the complexity coefficient of the SQL statement and a relational expression of a complexity coefficient and execution duration, the first estimated execution duration for the DBMS to execute the SQL statement.

10. The method according to claim 6, wherein the estimating, based on the complexity coefficient, the first estimated execution duration for the DBMS to execute the SQL statement comprises:
inputting the complexity coefficient into an execution time modification model, wherein a training sample of the execution time modification model comprises a complexity coefficient of a historical SQL statement executed by the DBMS and execution duration of the historical SQL statement; and
determining, by using the execution time modification model, the first estimated execution duration for the DBMS to execute the SQL statement.

11. An apparatus for estimating database management system performance, comprising:
a memory storing one or more instructions; and
at least one processor coupled with the memory, which when executing the one or more instructions, the at least one processor is configured to:
obtain a first knob group configured for a database management system (DBMS), and obtain a first data volume of active data in data managed by the DBMS, wherein the first knob group comprises at least one first knob;
obtain a second knob group, wherein the second knob group comprises at least one second knob;
determine a performance change ratio of the DBMS based on the first knob group and the first data volume of the active data, and the second knob group, wherein the performance change ratio indicates a change degree of DBMS performance achieved after the DBMS is configured using the second knob group compared with DBMS performance achieved when the DBMS is configured using the first knob group; and
estimate a performance indicator of the DBMS based on the performance change ratio of the DBMS, a first estimated execution duration for the DBMS to execute a structured query language (SQL) statement, and the first data volume of the active data, wherein the performance indicator comprises at least one of second estimated execution duration of the SQL statement and a throughput of the DBMS, and the second estimated execution duration is a modification value of the first estimated execution duration.

12. The apparatus according to claim 11, wherein the at least one processor is further configured to:
input the performance change ratio of the DBMS, the first estimated execution duration, and the first data volume of the active data into a performance estimator, wherein a training sample of the performance estimator comprises a historical performance change ratio of the DBMS, execution duration of a historical SQL statement, and a second data volume of active data managed by the DBMS and a historical performance indicator that are obtained when the DBMS executes the historical SQL statement; and
estimate the performance indicator of the DBMS using the performance estimator.

13. The apparatus according to claim 11, wherein the at least one processor is further configured to:
modify, based on the first data volume of the active data in the DBMS, knobs that are in the first knob group and the second knob group and that are related to the first data volume of the active data;
perform dimension reduction on the modified first knob group and second knob group to obtain a first vector and a second vector, wherein the first knob group is a vector whose dimension is higher than that of the first vector, and the second knob group is a vector whose dimension is higher than that of the second vector; and
determine the performance change ratio of the DBMS based on the first vector and the second vector.

14. The apparatus according to claim 13, wherein the at least one processor is further configured to:
adjust target knobs that are in the first knob group and the second knob group and that are related to the first data volume of the active data to be equal to the first data volume of the active data, wherein the target knobs are knobs that are in the first knob group and the second knob group and that are greater than the first data volume of the active data.

15. The apparatus according to claim 13, wherein the at least one processor is further configured to:
input the first vector and the second vector into a double knobs mixture model, wherein a training sample of the double knobs mixture model comprises a plurality of pairs of first historical knob groups and second historical knob groups that have been configured for the DBMS, and a performance change ratio that is of the DBMS and that is corresponding to each pair of first historical knob group and second historical knob group; and determine the performance change ratio of the DBMS using the double knobs mixture model.

16. The apparatus according to claim 11, wherein the at least one processor is further configured to:
   convert the SQL statement into a third vector;
   determine a complexity coefficient of the SQL statement based on the third vector; and
   estimate, based on the complexity coefficient, the first estimated execution duration for the DBMS to execute the SQL statement.

\* \* \* \* \*